US008557356B2

(12) United States Patent
Colson

(10) Patent No.: US 8,557,356 B2
(45) Date of Patent: Oct. 15, 2013

(54) TRANSLUCENT INSULATED GLASS PANEL

(75) Inventor: Wendell B. Colson, Weston, MA (US)

(73) Assignee: Hunter Douglas Inc., Upper Saddle River, NJ (US)

( * ) Notice: Subject to any disclaimer, the term of this patent is extended or adjusted under 35 U.S.C. 154(b) by 602 days.

(21) Appl. No.: 12/671,815

(22) PCT Filed: Aug. 6, 2008

(86) PCT No.: PCT/US2008/009440
§ 371 (c)(1),
(2), (4) Date: Feb. 2, 2010

(87) PCT Pub. No.: WO2009/020615
PCT Pub. Date: Feb. 12, 2009

(65) Prior Publication Data
US 2011/0195206 A1    Aug. 11, 2011

Related U.S. Application Data

(60) Provisional application No. 60/963,778, filed on Aug. 7, 2007, provisional application No. 61/068,044, filed on Mar. 4, 2008.

(51) Int. Cl.
*E06B 3/00* (2006.01)
*E04C 2/54* (2006.01)

(52) U.S. Cl.
USPC .................. 428/34; 52/786.11; 52/786.13

(58) Field of Classification Search
USPC ............. 428/34; 52/786.1, 786.11, 786.13
See application file for complete search history.

(56) References Cited

U.S. PATENT DOCUMENTS

| 3,358,867 | A | | 12/1967 | Skinner |
| 4,577,079 | A | | 3/1986 | Sujaku |
| 4,928,448 | A | | 5/1990 | Phillip |
| 5,110,337 | A | | 5/1992 | Lisec |
| 5,128,181 | A | * | 7/1992 | Kunert ............................ 428/34 |
| 5,514,428 | A | * | 5/1996 | Kunert ............................ 428/34 |
| 5,762,739 | A | | 6/1998 | Lenhardt et al. |
| 5,794,404 | A | | 8/1998 | Kim |
| 5,983,593 | A | * | 11/1999 | Carbary et al. ............ 52/786.11 |
| 6,479,112 | B1 | | 11/2002 | Shukuri et al. |
| 6,598,283 | B2 | | 7/2003 | Rouanet et al. |
| 6,620,355 | B1 | * | 9/2003 | Schmidt ........................ 264/41 |
| 6,622,456 | B2 | | 9/2003 | Almasy |
| 7,043,881 | B2 | | 5/2006 | Krause et al. |
| 2005/0072488 | A1 | * | 4/2005 | Rouanet et al. ................ 141/12 |
| 2006/0246806 | A1 | | 11/2006 | Rhine |
| 2006/0260270 | A1 | | 11/2006 | Swiszcz et al. |
| 2007/0087140 | A1 | | 4/2007 | Dierks |
| 2007/0122588 | A1 | * | 5/2007 | Milburn ...................... 428/117 |

FOREIGN PATENT DOCUMENTS

WO    2006077599    7/2006

* cited by examiner

*Primary Examiner* — Donald J Loney
(74) *Attorney, Agent, or Firm* — Day Pitney LLP

(57) ABSTRACT

A translucent insulated glass panel includes first and second glass plates separated from one another by a spacer. Together with the spacer, the first and second glass plates form a closed cavity. The closed cavity is filled with a translucent insulating material, preferably an aerogel material. The latter is in a compressed state, so that it will not settle over the course of time to produce an empty space or gap at the top of the panel.

25 Claims, 23 Drawing Sheets

TRANSLUCENT INSULATED GLASS PANEL

This application is a National Stage Application of PCT/US2008/009440, filed on Aug. 6, 2008, which claimed priority to U.S. Application No. 60/963,778, filed on Aug. 7, 2007 and U.S. Application No. 61/068,044, filed on Mar. 4, 2008, which are incorporated herein by reference.

BACKGROUND OF THE INVENTION

1. Field of the Invention

The present invention relates to glass panels formed by glass plates separated from one another by a spacer. More particularly, the present invention relates to such a glass panel, which is filled with a translucent insulating material, and to a method of manufacturing such a glass panel.

2. Description of the Prior Act

Translucent insulated glass panels have long been of interest in the building and construction industries. The reason is clear—such panels, while not transparent, allow a great deal of light to pass through them into a building, while inhibiting the flow of heat into or out of the building.

It has long been desired to use aerogel materials for filling the space between the glass plates of a panel of this variety. However, the use of such materials has been discouraged by their tendency to settle over time in response to subtle environmental vibrations and to slight movements caused by temperature-related expansion and contraction as well as by changes in atmospheric pressure, leaving, in time, an empty space or gap at the top of the panel. This unsightly effect has heretofore really discouraged the use of aerogel materials for this purpose.

The present invention provides a solution to this problem, which has long vexed those in the building and construction trades.

SUMMARY OF THE INVENTION

Accordingly, the present invention is a translucent insulated glass panel wherein the translucent insulating material is in a compressed state. In such a state, the cavity between the two glass plates making up the panel holds more translucent insulating material than it would if the material were in an uncompressed state. As a result, because the translucent insulating material is "overpacked" into the available volume, it is unable to settle to produce an empty space or gap.

More specifically, the translucent insulated glass panel comprises a first glass plate. The first glass plate has preselected dimensions and area, and two faces. The first glass plate has outer edges which define a perimeter for the glass plate.

An elongated spacer, having a width and a first side and a second side, is attached to one of the two faces of the first glass plate inward of its outer edges. The spacer forms a continuous closed path on the first glass plate.

A second glass plate, having preselected dimensions and area substantially identical to those of the first glass plate, also has two faces and outer edges which define a perimeter. One of the two faces of the second glass plate is attached to the second side of the spacer, which is inward of the outer edges of the second glass plate. The spacer and first and second glass plates thereby form a closed cavity between the first and second glass plates.

A sealant may cover the spacer between the edges of the first and second glass plates. Finally, a translucent insulating material fills the cavity between the first and second glass plates. The translucent insulating material is in a compressed state, whereby the cavity holds a greater amount of translucent insulating material than it would hold if the material were in an uncompressed state. The preferred translucent insulating material is an aerogel material. In a compressed state, the particles of aerogel material interlock with one another, thereby assuming fixed positions from which they cannot move or settle.

The present invention also includes a method for manufacturing the translucent insulated glass panel, and will be described in more complete detail below with frequent reference being made to the figures identified as follows.

DETAILED DESCRIPTION OF THE PREFERRED EMBODIMENTS

Figure 1:
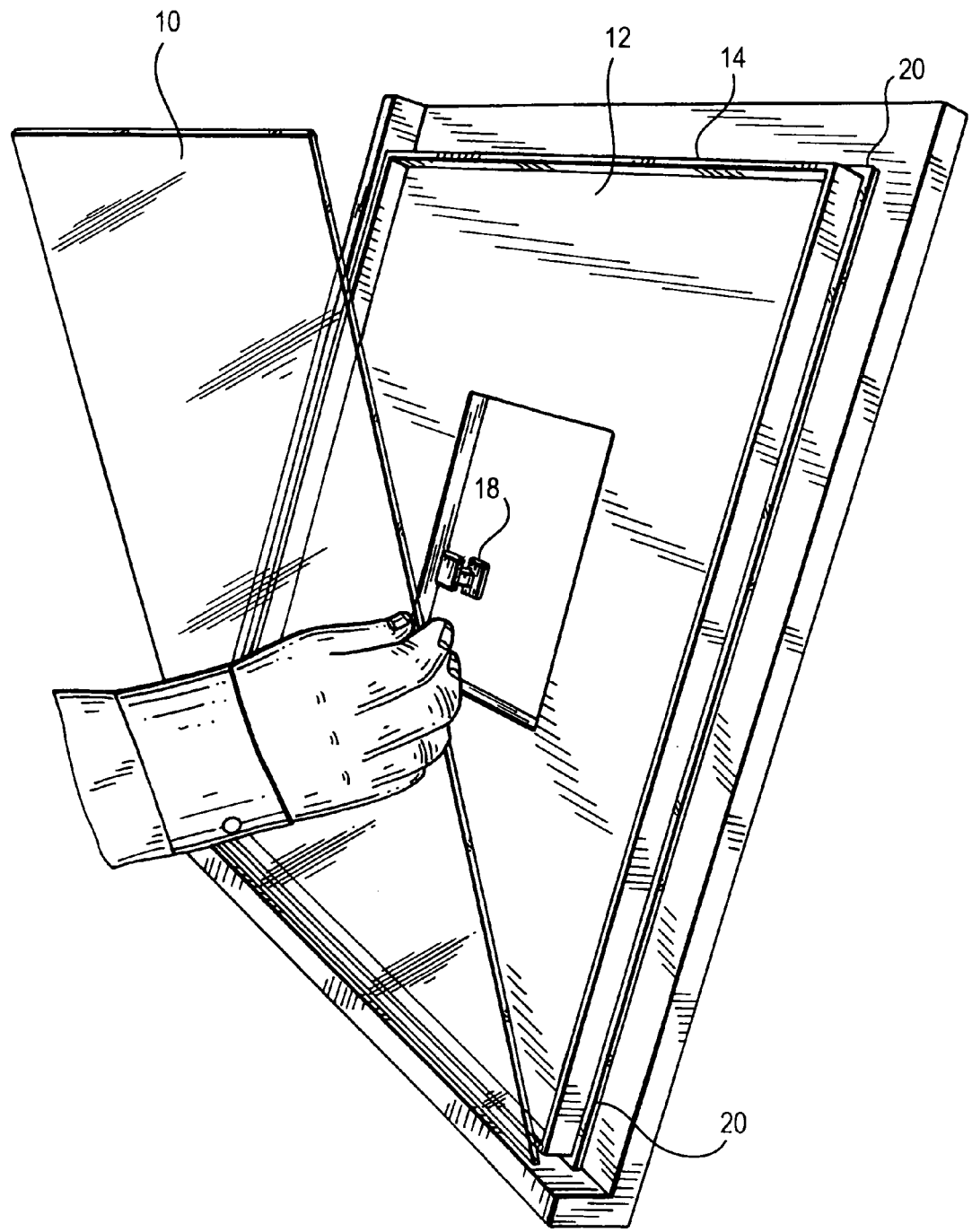
FIG. 1 is a perspective view of the initial steps in the manufacture of the translucent insulating glass panel of the present invention.

The translucent insulated glass panels of the present invention generally comprise a pair of parallel glass plates which are joined to one another around their edges by commercially available spacers, thereby forming a closed cavity therebetween for filling with a translucent insulating material.

The translucent insulating material of choice is aerogel, a unique form of highly porous silica having a lattice network of glass strands with very small pores. The solids content of aerogel is extremely low (5% solid, 95% air). Aerogel is recognized to be one of the most lightweight and best insulating solids in the world. In fact, a one-inch thickness of aerogel provides an R-value of 8.0, offering a high resistance of heat flow.

An aerogel highly suited for the practice of the present invention is available from Cabot Corporation of Billerica, Mass. under the name NANOGEL®. These aerogels are produced by a method which renders them hydrophobic with the result that they repel water that otherwise tends to degrade its component particles, which generally have sizes in a range from 0.5 mm to 4.0 mm.

One problem with aerogel material, however, is its tendency to settle over the course of time in response to vibrations and other small movements, such as expansion and contraction caused by temperature and pressure variations. More specifically, the volume of the closed cavity between the pair of parallel glass plates undergoes subtle variations as a result of pressure differentials between the interior of the closed cavity and its exterior due to changes in atmospheric temperature and pressure. With these slight variations, aerogel tends to settle as its component particles gradually achieve an ideal packing state. For this reason, it has heretofore not been possible to use aerogel between sealed glass insulating panels, because the settling would eventually leave a gap at the top of the panel, the gap size being proportional to the height of the panels. Over the course of time, the settling could be as much as 8 to 10% of the height, leaving a sizeable gap in a high panel.

In the translucent insulating glass panels of the present invention, the settling problem has been solved by packing, or compressing, the aerogel material into the available volume between the parallel glass plates which will be used to form the translucent insulating glass panel. In a compressed state, each particle of the aerogel material becomes locked into position relative to others. Settling is thereby prevented from occurring.

This solution to the settling problem is effected by compressing the aerogel material after the space between the parallel glass plates has been filled. The compression is generated, for example, by expanding the volume between the parallel glass plates during the filling process and, subsequently, by allowing that volume to return toward its initial size after filling has been completed, in effect, compressing more aerogel material into that volume than it would otherwise have held. During expansion, the parallel glass plates bulge outward to expand the volume of the closed cavity between them. To an extent, glass is flexible and spring-like. Once the mechanism causing the volume expansion is removed, the restorative spring force generated by the glass plates is exerted on the aerogel and compresses it. The glass plates do not return completely to a parallel state, but remain slightly bowed outward, so as to maintain the aerogel in a compressed state. It has been found, in general, that, if the volume is expanded by about 15% for filling, the settling problem will be solved completely. However, it should be understood that the amount of expansion that may be achieved in practice depends upon the size of the glass panel and upon the thickness of its glass plates. The volume of a small glass panel having thick glass plates may not be expandable by 15%; that of a large glass panel, on the other hand, may be expandable by more than 15%. Accordingly, it should be understood that 15% is only an approximation or "ballpark" figure, and should not be taken to be a limitation on the amount the volume of a given glass panel may or may not be expanded in the practice of the present invention, although it may be advisable not to expand by more than 15% to minimize the residual bulge in the finished product, as will be described below.

There are three possible approaches that may be taken to expand the volume between the parallel glass plates which are joined to one another around their edges by commercially available spacers. In the first, the volume is expanded mechanically through the use of suction devices similar to those used by glaziers to manipulate large plate glass windows. The suction devices are attached to opposite sides of the glass panel, that is, the parallel glass plates which are joined to one another, and pulled apart mechanically to expand the volume between the glass plates for filling. Subsequently, after filling has been completed, the suction devices are removed, allowing the glass plates to spring back toward their initial parallel state, in so doing compressing the aerogel material, although the glass plates will not return completely to their initial parallel state as the aerogel will prevent them from doing so, resulting in some residual outward bulge.

In the other two approaches, air pressure differentials are used to expand the volume to be filled. In each case, the pressure within the glass panel is greater than that outside, the pressure differential forcing the parallel glass plates to bulge outward relative to one another to expand the volume between them. Both of these two approaches are preferable to the mechanical expansion described above, as the amount and uniformity of the expansion can be more precisely controlled and involve the entire area of each of the parallel glass plates.

In one of these two other approaches, the glass panel is filled in an environment having an air pressure slightly less than the ambient atmospheric pressure, while the interior of the glass panel is maintained at the ambient level. In the other of the two approaches, the glass panel is filled in an environment at the ambient atmospheric pressure, while the interior of the glass panel is maintained at a slightly elevated pressure level. In either case, the relatively higher pressure within the glass panel expands the volume therewithin by forcing the parallel glass plates to bulge outwardly relative to one another.

While each of these two approaches would present its own technical challenges, the first is the preferred approach and will be described in more complete detail below. In the second approach, not only would the interior of the glass panel have to be maintained at a slightly elevated pressure level, but so also would the system used to deliver the translucent insulating material. For this reason, the first approach, where the interior of the glass panel remains at ambient pressure level throughout the filling process, and therefore the system used to deliver the translucent insulating material can also remain at ambient pressure level, is preferred.

Turning now to FIG. 1, the initial steps in the manufacture of the translucent insulating glass panel of the present invention are illustrated. A first glass plate 10 and a second glass plate 12 of substantially common dimension are used. The glass plates 10, 12 may be of low-iron glass to increase solar transmission and of 0.25-inch thickness. The glass plates 10, 12, further, may measure 2.0 feet by 2.0 feet, although the use of smaller or larger plates than these is envisioned and is included within the scope of the invention. Spacer 14, which is of approximately 0.75-inch width, is commercially available from Edgetech IG Inc. of Cambridge, Ohio as SUPER SPACER®. Spacer 14 is extruded from polymer foam, which may include a desiccant to remove any water vapor that may be trapped between glass plates 10, 12 during the manufacturing process. Spacer 14 may include no metal to further minimize heat loss through the glass panel, although, alternatively, spacer 14 may include an aluminum foil backing layer to reduce the moisture permeability thereof.

Figure 2:
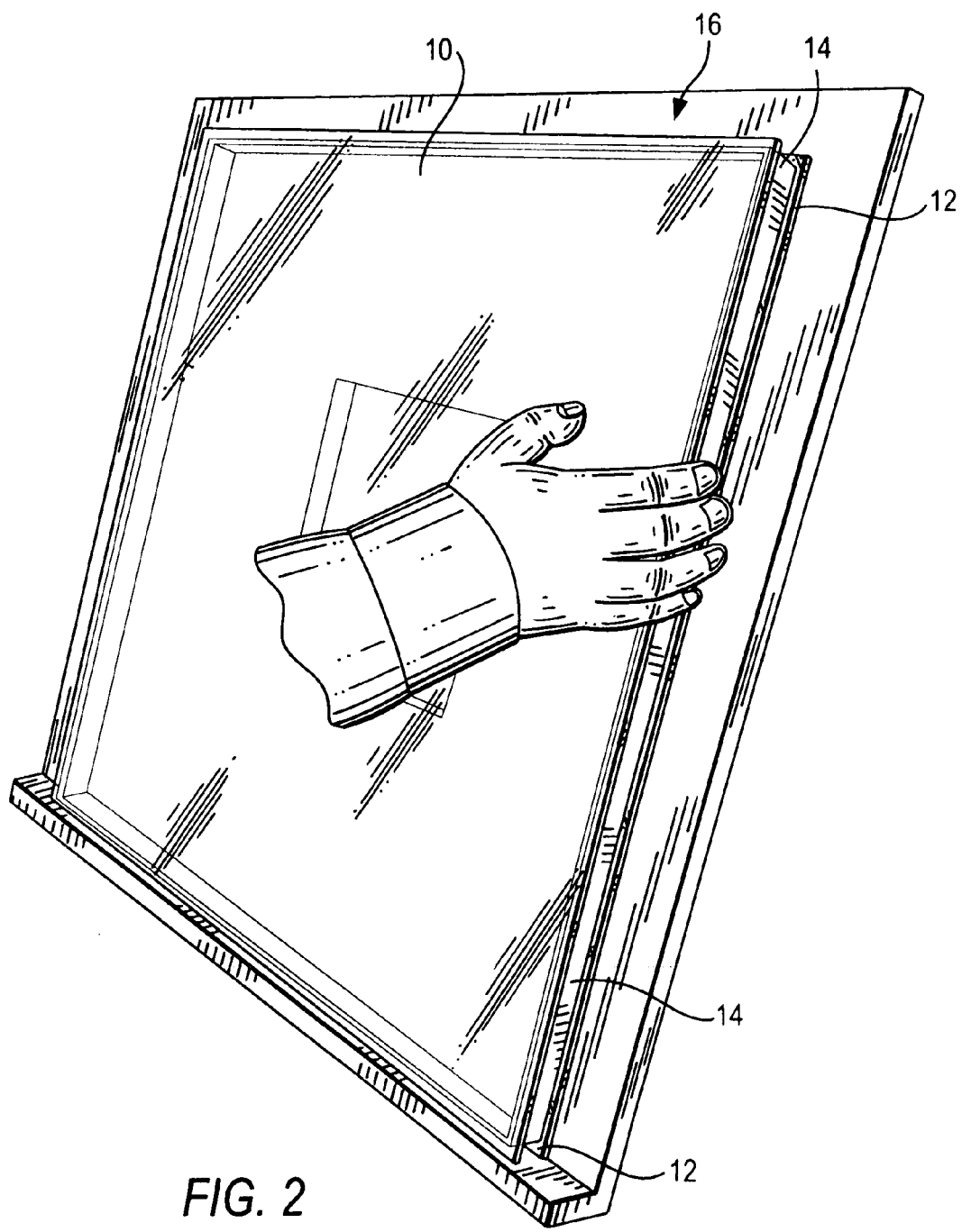
FIG. 2 is a perspective view showing the appearance of the glass panel after a subsequent step in the manufacturing process.

The spacer 14 is disposed about the perimeter of the glass plate 12 inward of its edges 20, as shown in FIG. 1, and attached thereto with an adhesive. Subsequently, glass plate 10 is disposed over spacer 14 to form the glass panel 16, as shown in FIG. 2, and attached thereto with an adhesive. This action allows the spacer 14 to make a firm, airtight seal with the two glass plates 10, 12.

Figure 3:
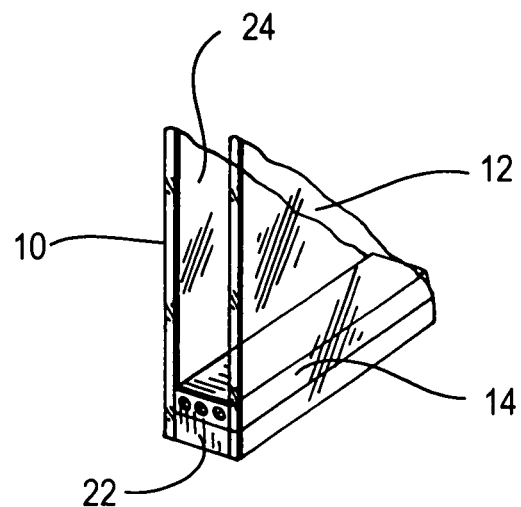
FIG. 3 is an enlarged, sectioned view of the glass plates forming the glass panel.

FIG. 3 is an enlarged sectioned view of the glass plates 10, 12 and spacer 14. Once the glass plates 10, 12 are joined to one another by means of the spacer 14, a sealant 22 of a resilient, solid polymeric material may be disposed about the outer edges of the glass panel 16 and attached thereto with an adhesive to further seal the cavity 24 between glass plates 10, 12 from the outside environment.

Where the glass plates 10, 12 are larger than approximately 2.0 feet by 2.0 feet, it has been discovered that the expansion of the glass panel 16 during the filing process may be too large for the glass plates 10, 12 to ever compress the translucent insulating material sufficiently to return to a parallel state. As will be discussed below, the filling process, in this preferred embodiment, is carried out in an environment wherein the atmospheric pressure is a preselected amount less than the ambient air pressure. The larger the glass panel, the worse the overexpansion becomes. For example, for a glass panel which is 6 feet high having a 0.75-inch spacer, the separation between the glass plates could become as large as 1.75 inch in their centers. It has been found that this overexpansion could be partially alleviated by drawing air from the cavity between the plates after filling with translucent insulating material has been completed, and then sealing the cavity. The difficulty with such an approach, of course, is that the seal must hold for the life of the translucent insulating panel so made. While it would be difficult to maintain a complete vacuum in the cavity for the life of the panel, it would be relatively easy to hold the pressure in the cavity to 20% to 25% of atmospheric pressure for that time. Such a pressure within the cavity would flatten the glass plates to a degree.

Figure 4:
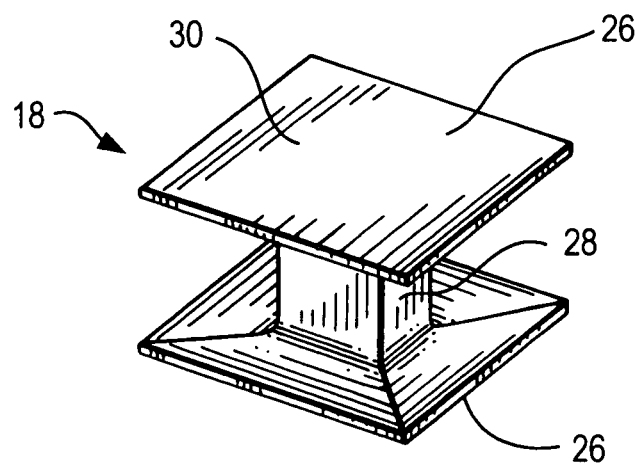
FIG. 4 is a perspective view of a connector.

An alternative approach is to use bonded connectors between the glass plates. Referring back to FIG. 1, a connector 18 is secured to the center of glass plate 12. A perspective view of a connector 18 is shown in FIG. 4. Generally, the connector 18 comprises a pair of parallel planar members 26 joined to one another by a connecting member 28. The parallel planar members 26 have surfaces 30 which are separated from one another by a distance equal to the width of the spacer 14.

Connector 18 may be of white, black or clear plastic material, with black being the most attractive and aesthetically pleasing option. Connector 18 is bonded to glass plates 10, 12 with an adhesive, perhaps of the UV-activated type. As shown in FIG. 1, connector 18 is first bonded to glass plate 12, the adhesive is applied to surface 30 of the other parallel planar member 26 for attachment to glass plate 10, when the latter is attached to spacer 14 as shown in FIG. 2.

Figure 5:
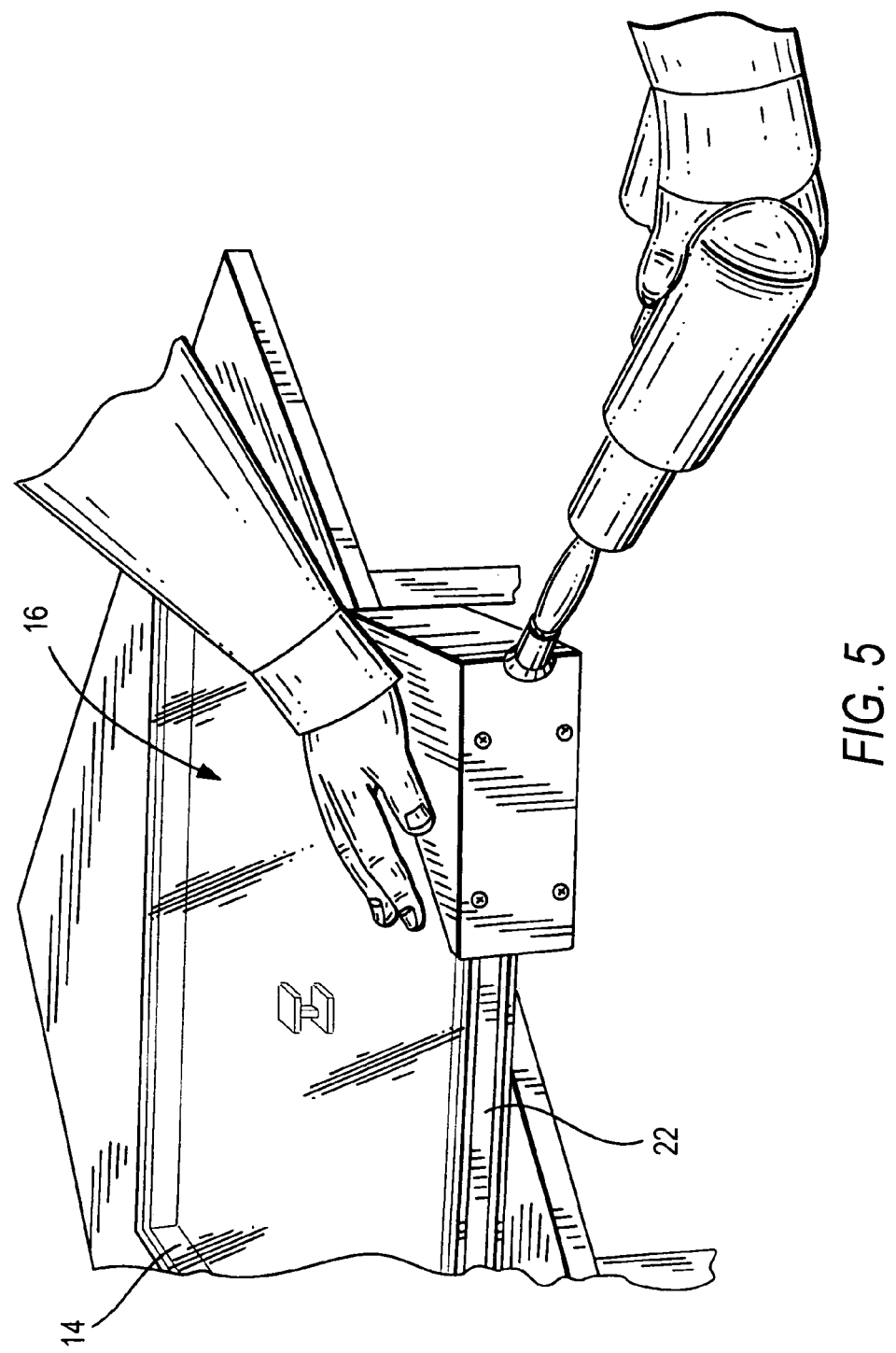
FIG. 5 shows the formation of a hole used to fill the glass panel with translucent insulating material.

Following the assembly of glass panel 16 to the condition shown in FIG. 2 and the application of sealant 22 around its outer edges, a hole is formed through the spacer 14 and sealant 22 at one corner of the glass panel 16, as shown in FIG. 5. The hole may have a diameter of 0.625 inch, and, more generally, must have a diameter equal to that of the tube through which translucent insulating material is delivered to the cavity 24 between glass plates 10, 12 of the glass panel 16.

Figure 6:
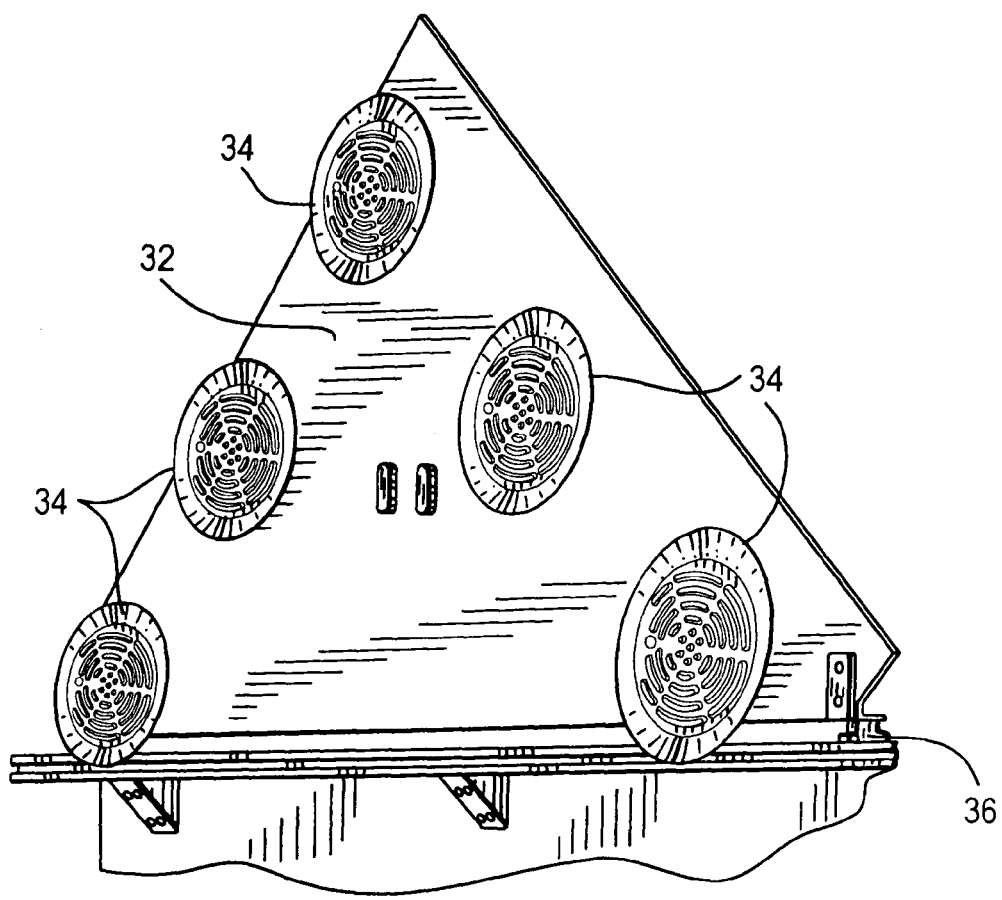
FIG. 6 is a perspective view of the apparatus used to hold the glass panel during filling.

Turning now to the apparatus used to fill the cavity 24 with translucent insulating material, a rigid plate 32 is mounted on vibration isolators 36 in a vertical orientation, as shown in FIG. 6. The vibration isolators 36, which are rubber-like connecting members used to mount the rigid plate 32 to its support at each of three corners enable the rigid plate 32 to be vibrated by a motorized vibrator attached thereto without vibrating the entire apparatus. The motorized vibrator, mounted on the rear of the rigid plate 32, includes a variable speed motor which rotates, for example, an asymmetric weight or other member unbalanced with respect to the its axis of rotation so as to set up vibration in the rigid plate 32 at a frequency equal to that of the rotation.

Figure 7:
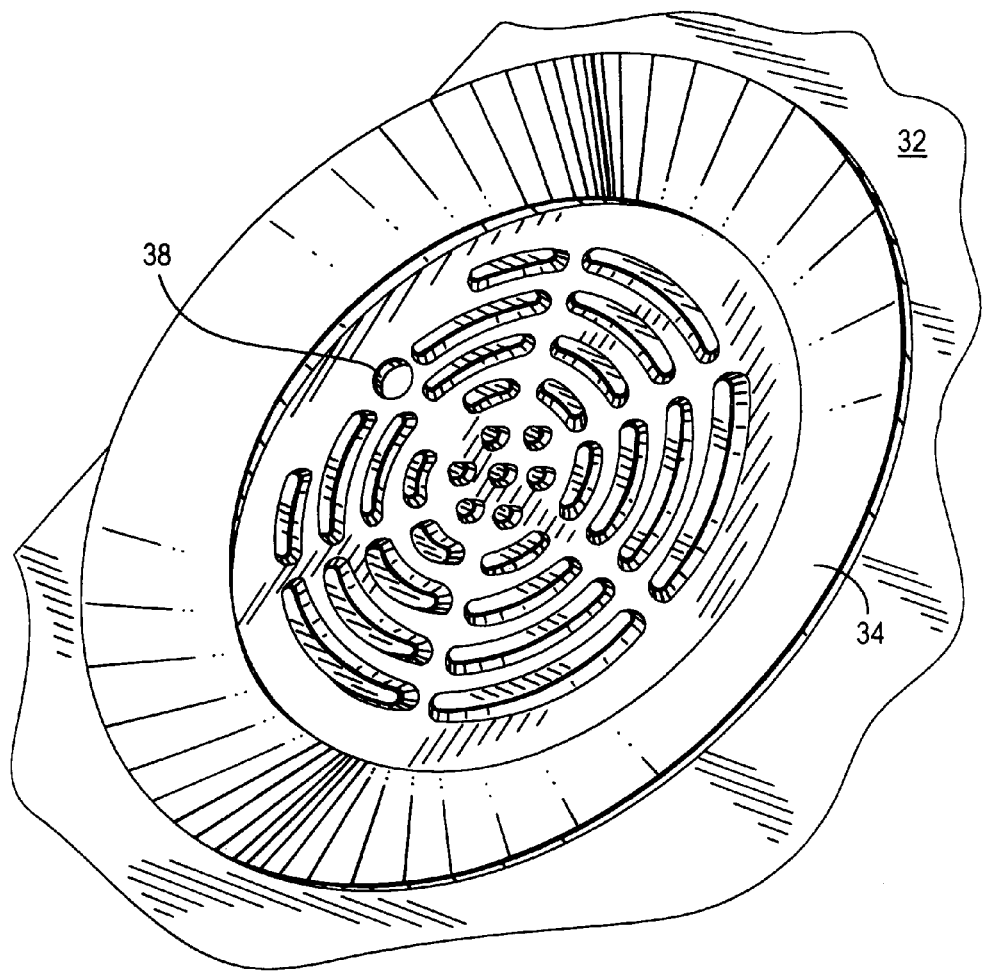
FIG. 7 is a perspective view of a glass-holding suction cup used to hold the glass panel.

On the face of rigid plate 32 are disposed one or more glass-holding suction cups 34. An enlarged view of a glass-holding suction cup 34 is shown in FIG. 7. Suction cup 34 is connected to a pump which draws air in through hole 38. When the suction cup 34 is covered with a glass panel 16 when the air pump is operating, the glass panel 16 remains firmly held in position.

Figure 8:
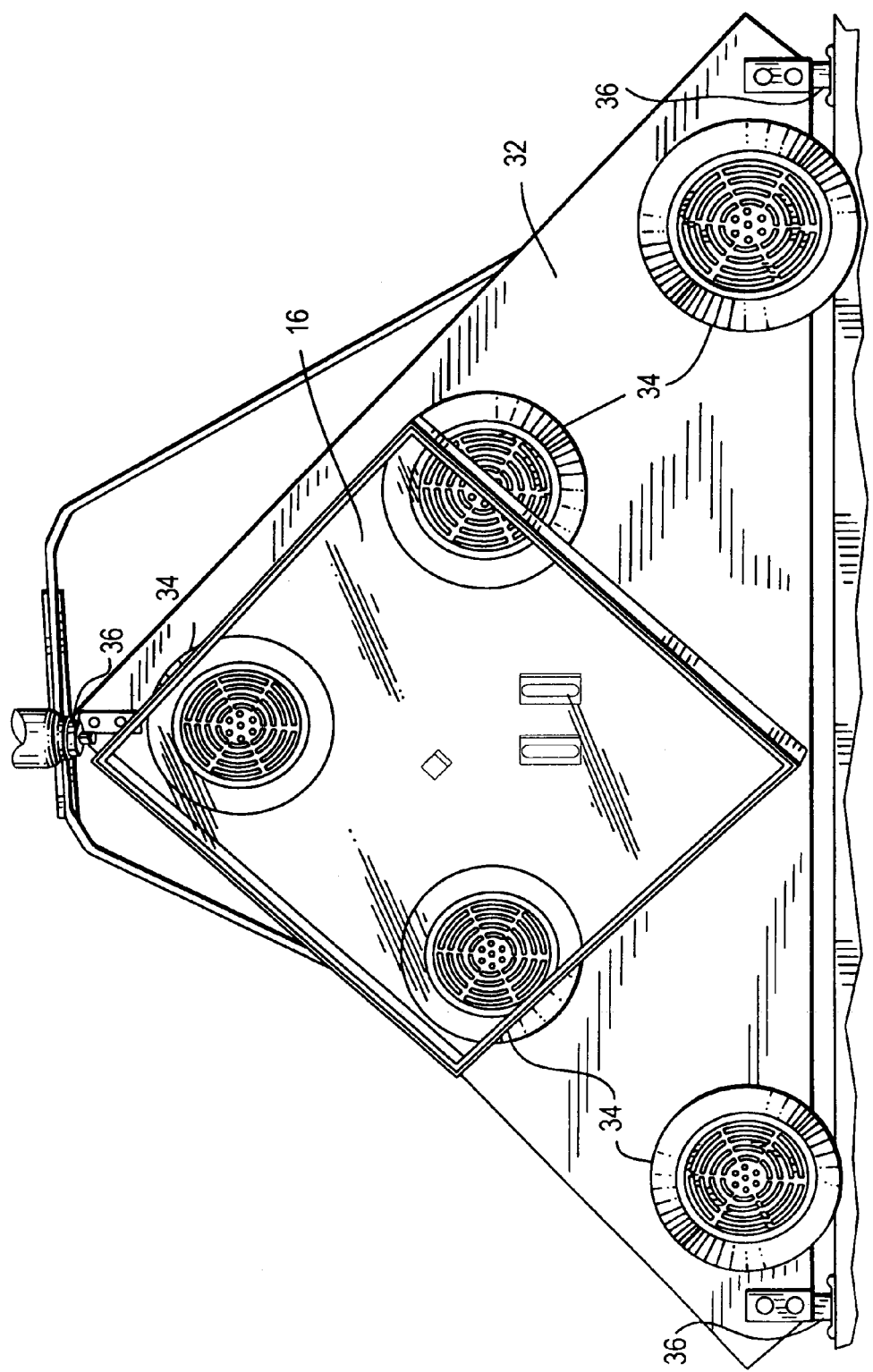
FIG. 8 is a plan view showing the glass panel mounted on the rigid plate.

Turning now to FIG. 8, glass panel 16 is mounted on rigid plate 32 with the corner having the hole, formed through the spacer 14 and sealant 22 at the topmost position. As will be readily apparent, not every glass-holding suction cup 34 is required to hold glass panel 16. In fact, only the topmost suction cup 34 is required for the glass panel 16 of the size illustrated. For larger glass panels, three or more of the suction cups 34 may be required.

Figure 9:
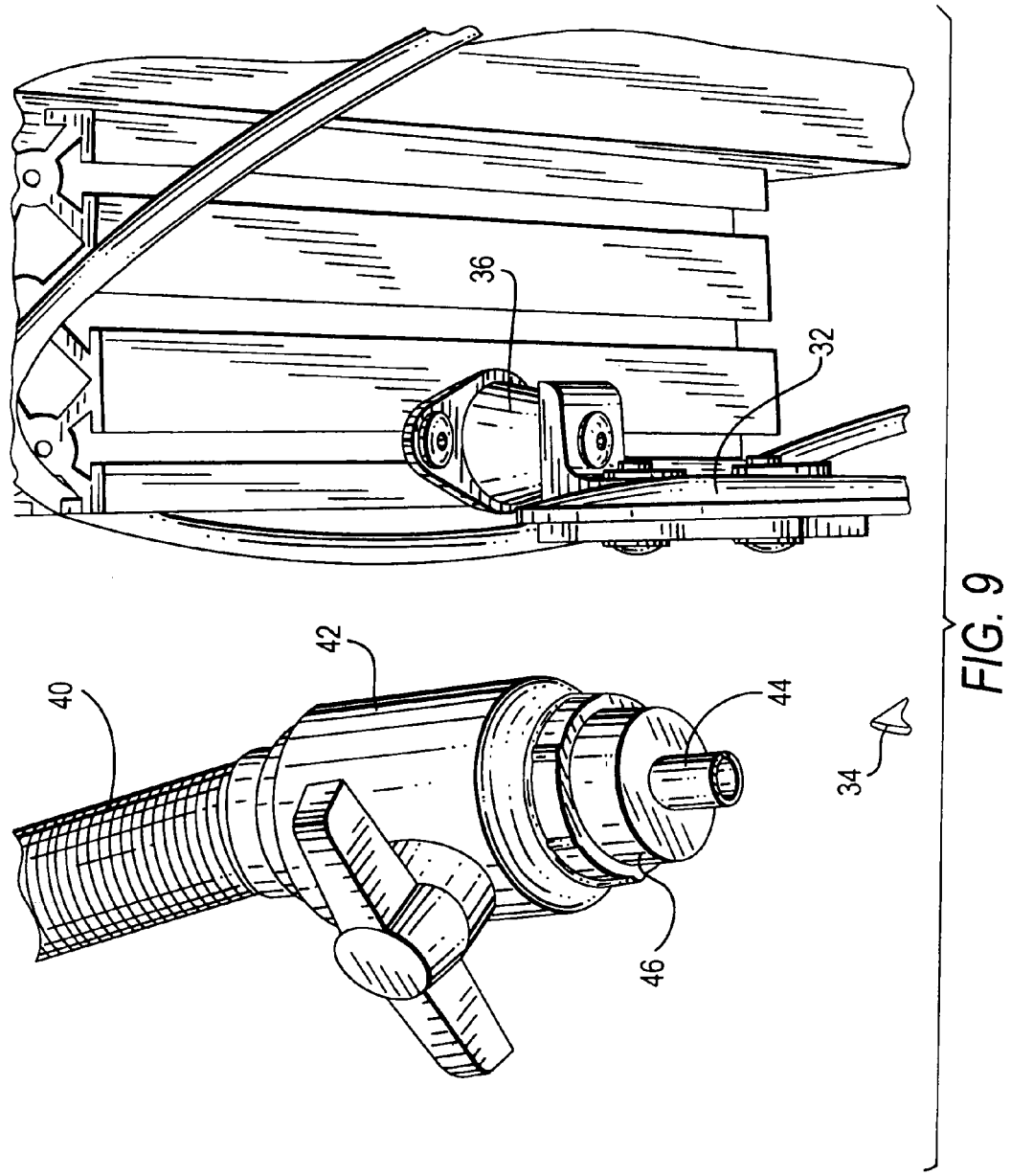
FIG. 9 is a perspective view of a portion of a translucent insulating material delivery system.

FIG. 9 is a perspective view of a portion of the translucent insulating material delivery system. Translucent insulating material is delivered through tube 40 to a valve unit 42 having a snout 44. Snout 44 has a diameter equal to that of the hole through the spacer 14 and sealant 22 in the corner of the glass panel 16, a diameter which may be the 0.625 inch noted above. In any event, whatever the exact value of the diameter, a tight seal of the snout 44 in the hole is required to ensure that the cavity 24 of the glass panel 16 remains at ambient atmospheric pressure when the glass panel 16 is expanded.

Figure 10:
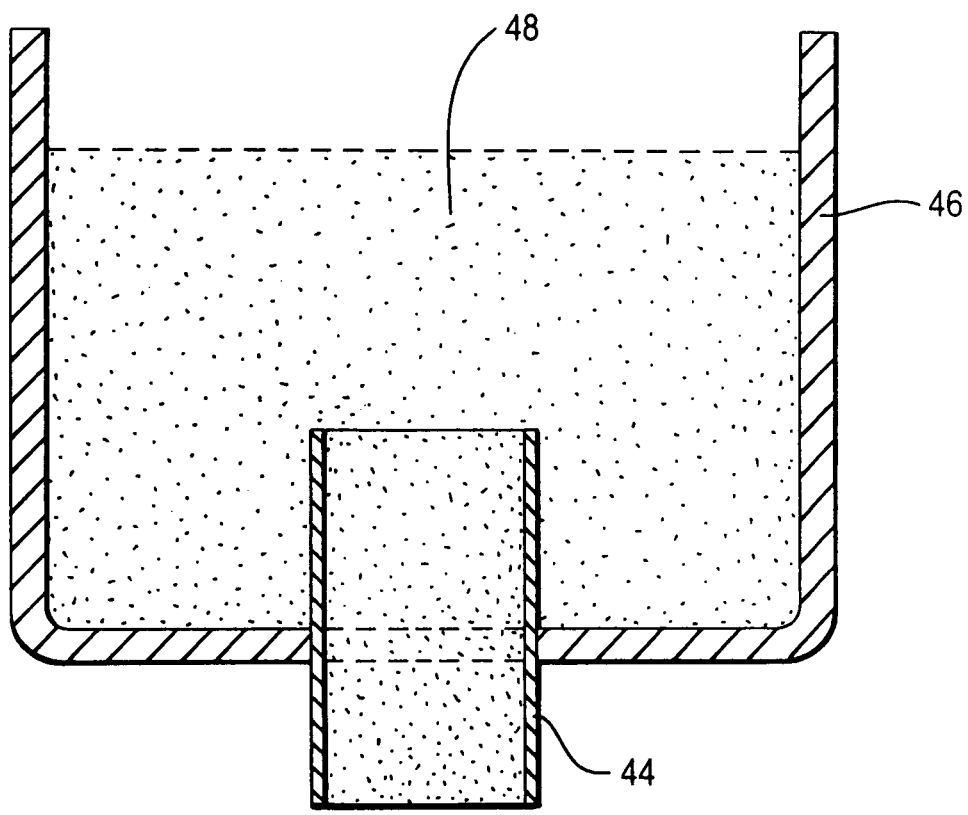
FIG. 10 is a cross-sectional view through the snout and cup-shaped member of the translucent insulating material delivery system.

It is instructive to note that the snout 44 is attached to the valve unit 42 by a cup-shaped member 46. A cross-sectional view through the snout 44 and cup-shaped member 46 is shown in FIG. 10. Snout 44 extends upward through the bottom of cup-shaped member 46. As a consequence, translucent insulating material, aerogel 48, being delivered through tube 40 and valve unit 42 falls into cup-shaped member 46, where its level rises eventually to that of the top of the snout 44. At that point, it will simply fall out the bottom of the snout 44 into the cavity 24 between glass plates 10, 12. As the aerogel 48 simply falls straight down from the cup-like member 46, there is no funneling action where the particles of aerogel 48, buttressing against one another, can form a bridge which may stop the flow or render it discontinuous.

The translucent insulating material delivery system also includes, upstream from valve unit 42 and tube 40, a dryer through which the translucent insulating material flows, or, more exactly, falls under the influence of gravity. The dryer's purpose is primarily to remove any water that may be held by the aerogel 48 to reduce the likelihood that condensation will form within the glass panel 16 at any time after it is filled.

Figure 11:
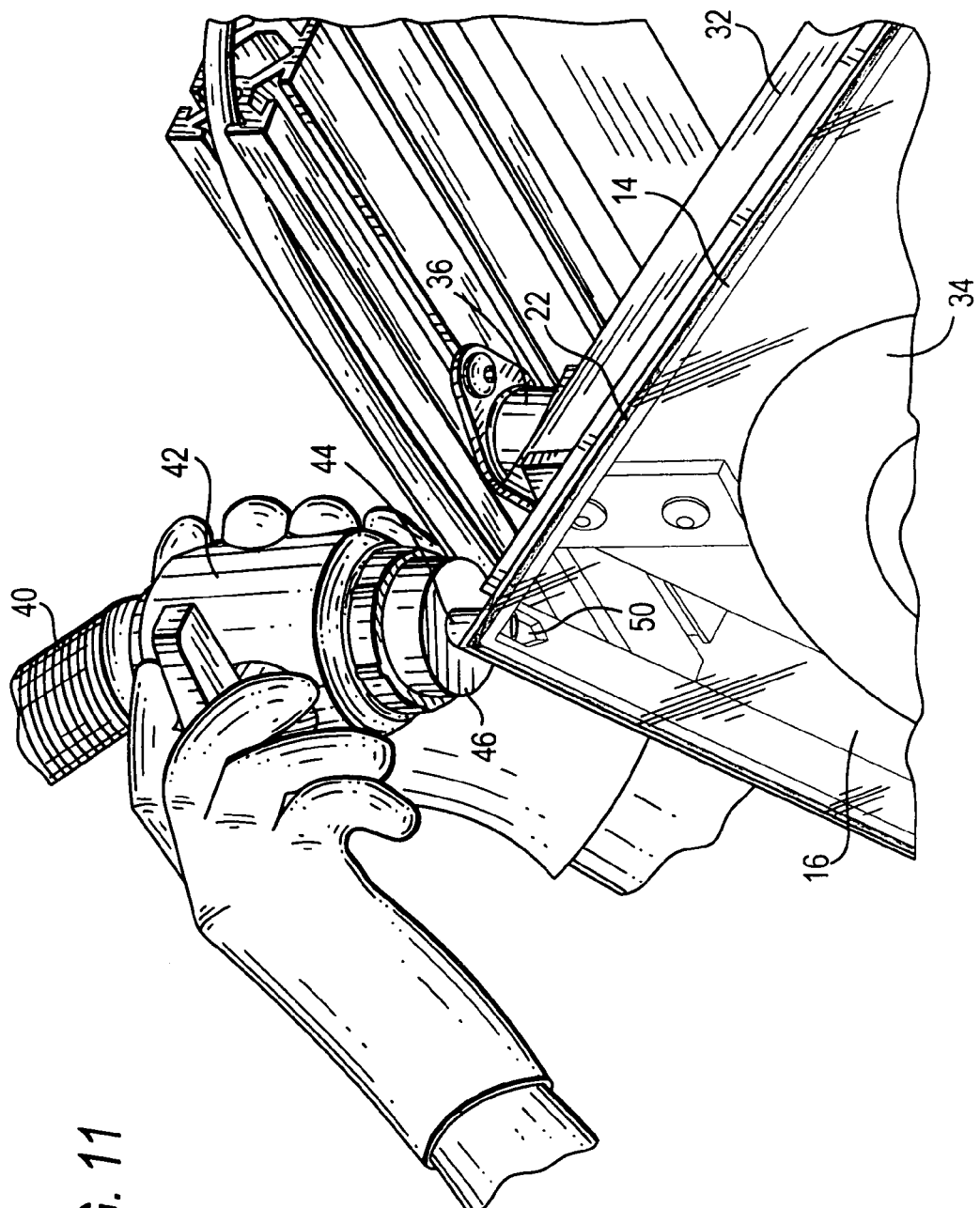
FIG. 11 is a perspective view showing the attachment of the delivery system to the glass panel.

FIG. 11 is a perspective view showing glass panel 16 attached to rigid plate 32 by means of glass-holding suction cup 34. Snout 44 is shown directed through hole 50 in spacer 14 and sealant 22, where it makes a snug fit.

Figure 12:
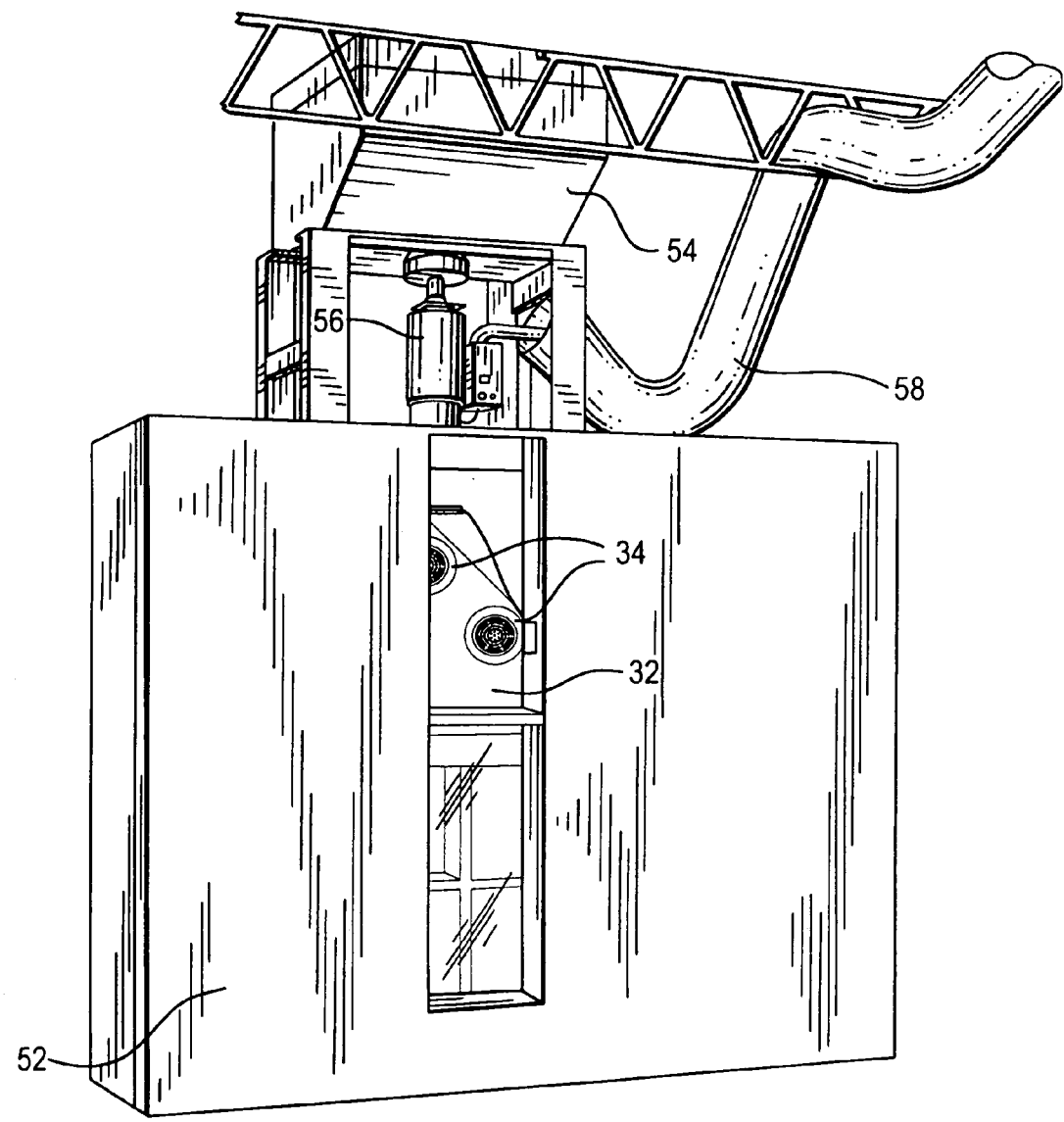
FIG. 12 is a perspective view of a housing used for the filling of a glass panel with translucent insulating material.

Now, once the glass plate is so arranged, and the gravity-fed flow of translucent insulating material is begun, the housing 52, in which the rigid plate 32 is mounted, is closed up and sealed from the ambient atmosphere. The housing 52, shown in a perspective view in FIG. 12, is essentially a box in which glass panel 16 can be immersed in an atmosphere at a pressure slightly less than that of the ambient while it is being filled with a translucent insulating material. Once closed, air is pumped out of the housing 52, although, since it may not be perfectly airtight, some air may always be entering. For this reason, the air is pumped out continuously, and a regulator is used to admit air when the pressure within the housing 52 falls below a preselected amount below the ambient pressure. The preselected amount may be 1.0 inch-Hg, although the optimum amount to be chosen in a specific case depends upon the size of the glass panel, upon the thickness of its glass plates, and upon whether the glass panel includes connectors. Smaller panels may need more than 1.0 inch-Hg, while larger panels may need less. Also shown in FIG. 12, is the aerogel supply 54, from which aerogel is fed by gravity through the dryer 56 and into the housing 52 via tube 40. Ventilation duct 58 carries away dust and moisture generated within the dryer 56.

As previously discussed, while the interior of the housing 52 is maintained at a pressure at a preselected amount, such as 1.0 inch-Hg, below the ambient pressure, the cavity 24 within the glass panel 16 remains at the ambient pressure because it communicates directly to the outside of the housing 52 through the translucent insulating material delivery system. As such, the glass panel 16 is expanded somewhat by the higher air pressure within the cavity 24, the amount of expansion being limited to a desired amount through the use of connectors 18, if necessary.

During the filling process, the motorized vibrator is operated to vibrate the rigid plate 32 and the glass panel 16 attached thereto. As would be recognized by those of ordinary skill in the art, the glass panel 16 would resonate at one or more frequencies governed by the dimensions and other characteristics of their construction. The settling of the aerogel is believed to be optimized by vibrating the glass panel 16 at a resonant frequency while the filling is progressing. A resonant frequency can readily be identified by the maximization of the vibration in the glass panel 16 when the motorized vibrator is "tuned" to the appropriate frequency by adjusting the speed of the motor.

When filling is almost complete, the vibrator motor is run up and down through several resonant frequencies to cause a final settling, creating a small space at the very top which is topped off with aerogel.

Referring back now to FIGS. 8 and 11, it will be recalled that the glass panel 16 is mounted on rigid plate 32 by means of glass-holding suction cup 34, or cups 34, in a diagonal orientation whereby one corner of the glass panel 16, where hole 50 has been provided, is at a topmost position. By filling the glass panel 16 with the translucent insulating material, aerogel 48, the cavity 24 between its constituent glass plates 10, 12 may be completely filled. The continuous shaking imparted by the motorized vibrator, operating at a resonant frequency during the filling process, ensures that the aerogel 48 completely fills the cavity 24 instead of piling up immediately beneath hole 50. In addition, and perhaps most importantly for aesthetic reasons, the continuous shaking substantially eliminates stratification of the aerogel 48.

"Stratification" refers to the lines that may be formed in the aerogel 48 during the filling process. Recalling that the sizes of the particles of the preferred aerogel, NANOGEL®, fall in a range from 0.5 mm to 4.0 mm, the reason for the stratification may best be understood as follows. Without vibration at a resonant frequency of the glass panel 16, as noted above, the aerogel 48 would tend to pile up beneath the hole 50. Upon reaching a certain critical height, the aerogel 48 would tend to slump, in the manner of an avalanche, down the sides of the pile. Because the aerogel 48 has particles in a distribution of sizes, the slumping will cause particles to separate by size forming noticeable lines or strata in the filled glass pane 16.

While resonant vibration during the filling process has largely eliminated this stratification, by causing a continuous spreading of the particles rather than periodic slumping, a faint vertical stratification line may nevertheless still be formed beneath the delivery point of the aerogel 48, hole 50, and will appear as a faint diagonal line in the filled glass panel 16.

Figure 13:
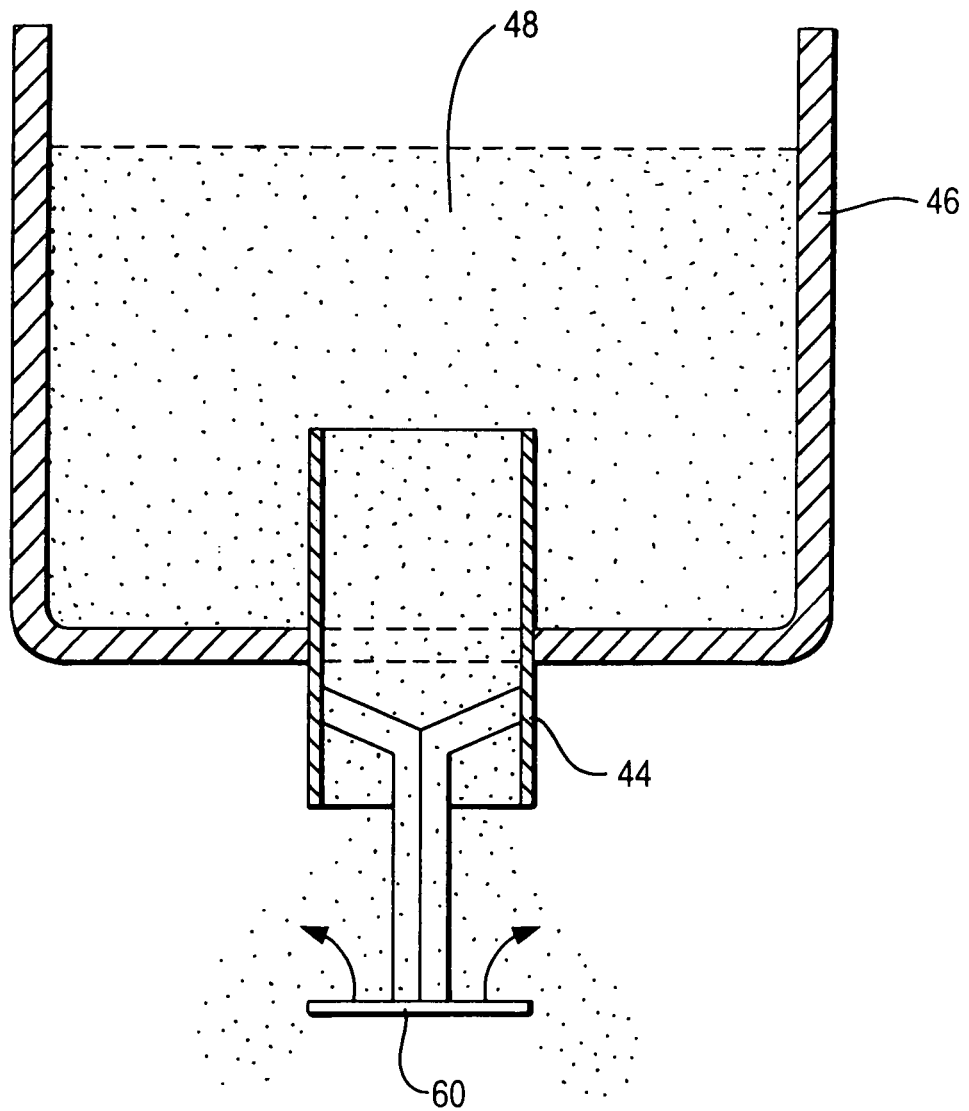
FIG. 13 is a cross-sectional view similar to that of FIG. 10 showing a first modification thereto.

This last effect may be eliminated by preventing the smallest aerogel particles from accumulating below the delivery point, hole 50. Two approaches have been shown to accomplish this. In this first, illustrated in FIG. 13, a baffle 60 mounted below snout 44 breaks up the stream of aerogel 48 passing therethrough and prevents the smallest particles in the size distribution thereof from collecting immediately below the snout 44.

Figure 14:
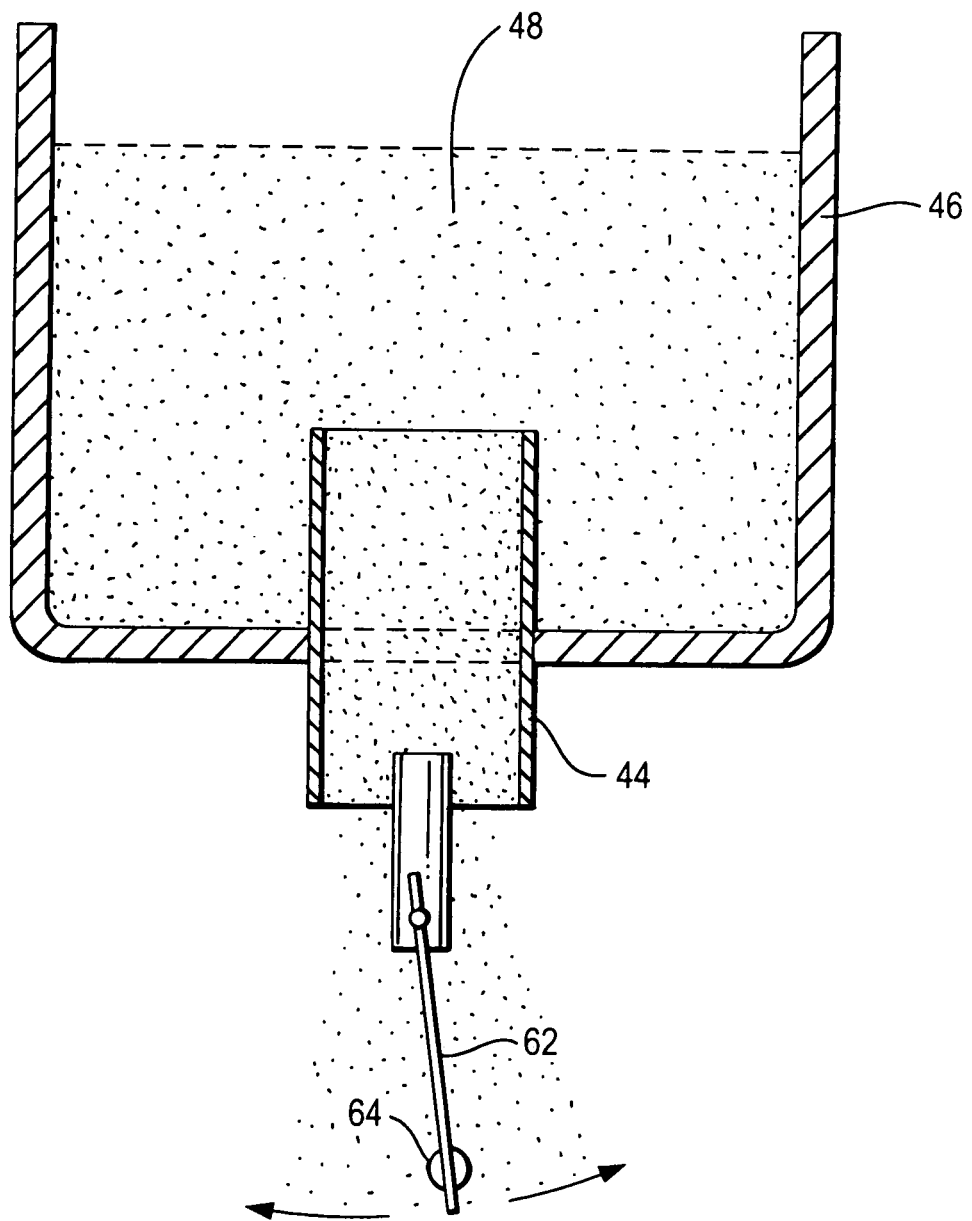
FIG. 14 is a cross-sectional view, also similar to that of FIG. 10, showing an alternative modification thereto.

In the other approach, illustrated in FIG. 14, a paddle 62 mounted below snout 44 and having a magnet 64 attached to the freely swinging end thereof breaks up the stream of aerogel 48 when oscillated by a magnet outside of the glass panel 16.

Figure 15:
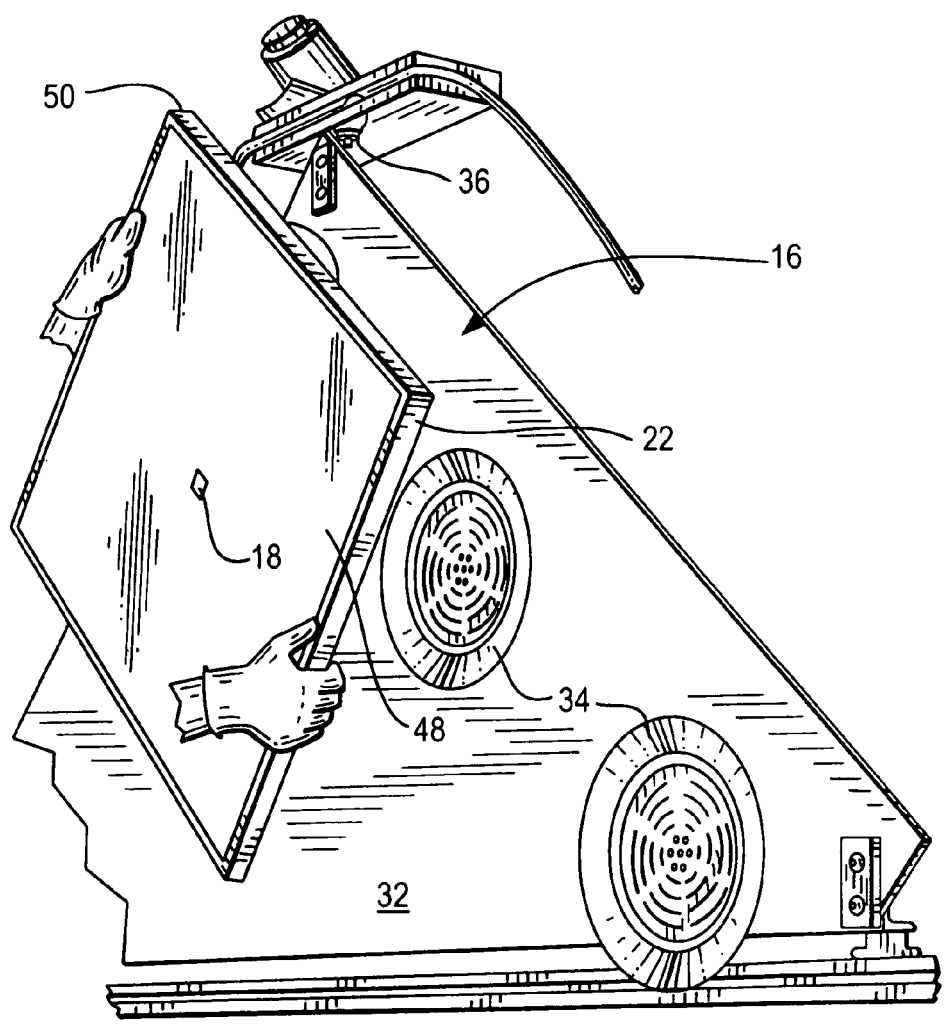
FIG. 15 is a perspective view of the removal of the glass panel from the rigid plate after filling.

In any event, when the glass panel 16 is completely filled with aerogel 48, the housing 52 is allowed to return to ambient atmospheric pressure by discontinuing the pumping of air therefrom. In a short time, when the pressure within the housing 52 is the same as that without, the housing 52 is opened and the filled glass panel 16 removed, as shown in FIG. 15. At this point, it is necessary to seal the hole 50.

Figure 16:
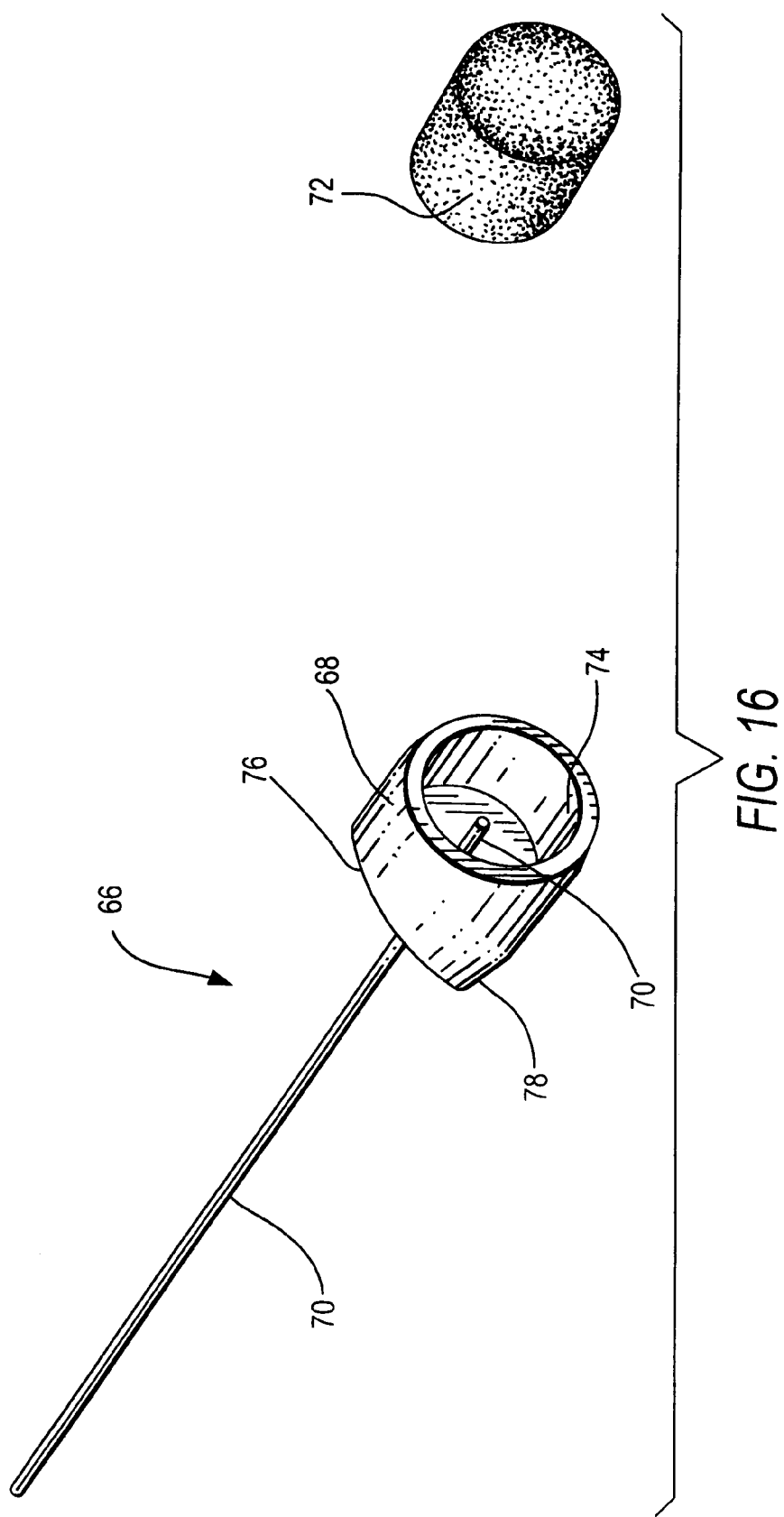
FIG. 16 is a perspective view of a plug and polymeric foam insert.
Figure 17:
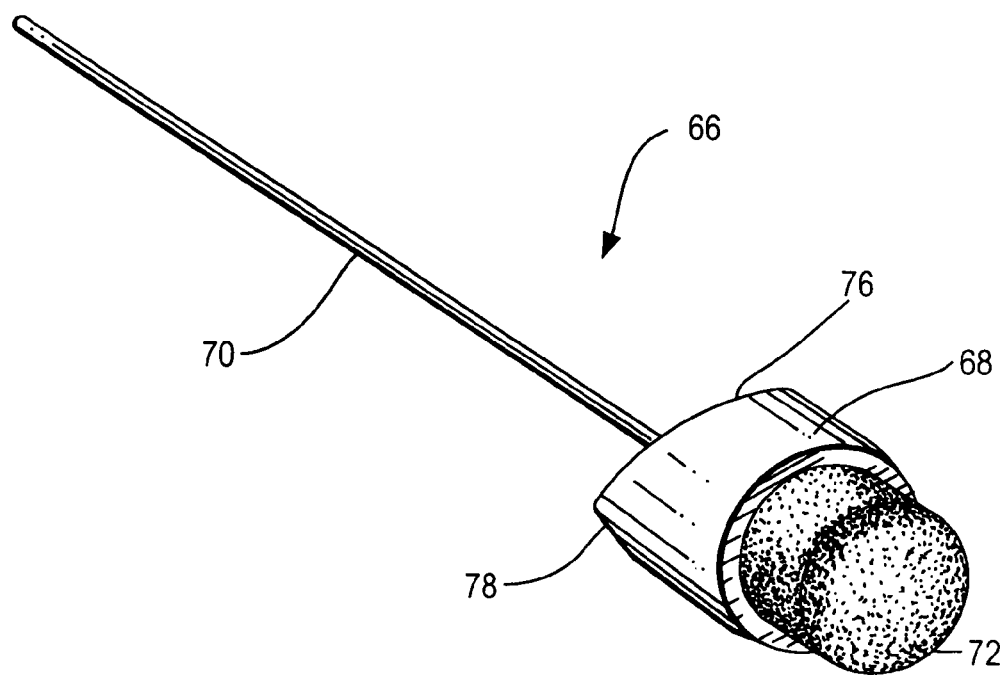
FIG. 17 is a perspective view of the plug with polymeric foam insert in place.

FIG. 16 is a perspective view of a plug 66 that may be used for this purpose. Plug 66 includes a body portion 68 and a capillary tube 70 which passes therethrough. Capillary tube 70 is provided so that, once the plug 66 has been used to seal hole 50, some air may be withdrawn from the cavity 24 between the glass plates 10, 12, as previously noted above. Polymeric foam insert 72 is provided to fit within the interior 74 of body portion 68, as shown in FIG. 17, so that small particles of aerogel 48 will be unable to block capillary tube 70 when air is being withdrawn. When the desired amount of air has been withdrawn, the capillary tube 70 can be crimped to close off the passage therethrough and the excess capillary tube 70 cut away and removed.

It will be noted in FIGS. 16 and 17 that body portion 68 of plug 66 includes rear surfaces 76, 78 whose planes are perpendicular to one another. These rear surfaces 76, 78 form the corner of the glass panel 16 when plug 66 is used to seal hole 50.

Figure 18:
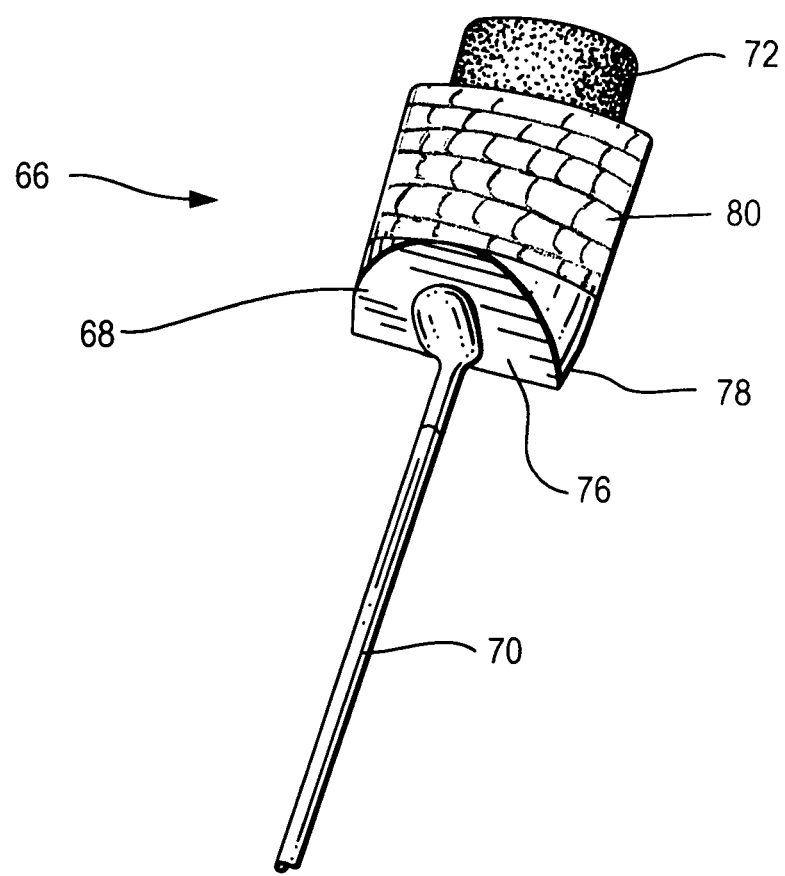
FIG. 18 is a perspective view of the plug with adhesive prior to use in sealing the hole used to fill the glass panel with translucent insulating material.
Figure 19:
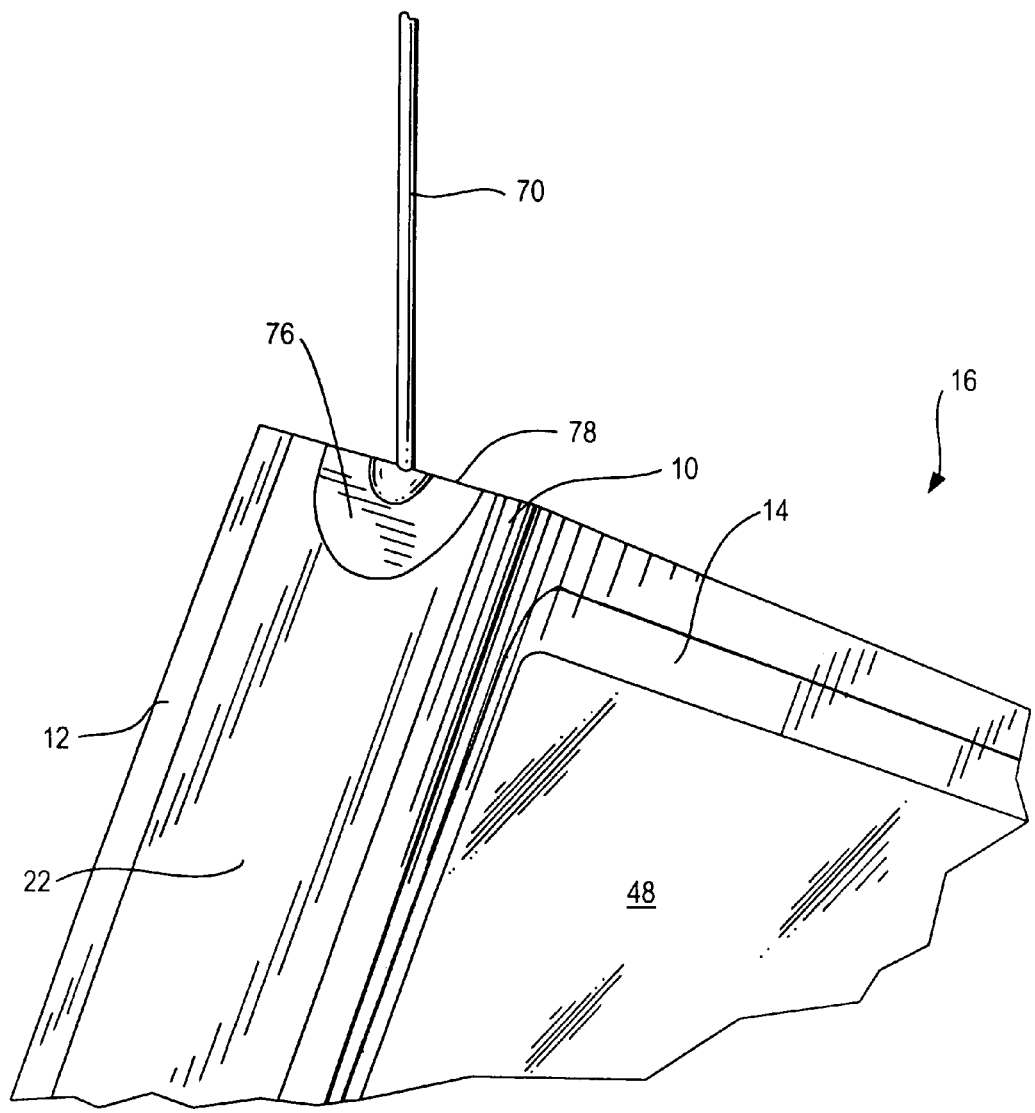
FIG. 19 is a perspective view of the plug as installed.

FIG. 18 is a plan view of the plug 66 with an adhesive 80 applied to cover the outside cylindrical surface of body portion 68. Plug 66 is then installed in hole 50 through sealant 22 and spacer 14 at the corner of glass panel 16 to seal the cavity 24 between glass plates 10, 12, as shown in FIG. 19. As stated above, air may be withdrawn from the cavity 24 between glass plates 10, 12 before the capillary tube is crimped to finally seal the glass panel 16. This may be done, as discussed above, to correct for overexpansion of the glass panel 16 during filling, as well as to lower the pressure in the glass panel 16 somewhat below ambient, so that any moisture remaining between glass plates 10, 12 will be less likely to form condensation.

It has been stated above that the present invention may be used to manufacture translucent insulating glass panels of any size. However, where the panels are large, it may be desirable to include windows, free of translucent insulating material, within them, so that a person within a building having the translucent insulating glass panel may be have a way to see outside. Such a glass panel 80, which may be 6.0 feet wide and 5.0 feet high, is shown in FIG. 20.

Glass panel 80, of course, is manufactured in a manner identical to that described above, except that means are employed to keep the windows 82 free of aerogel during the filling process. It will be noted that windows 82 in FIG. 20 have frames 84, which are the way the windows 82 are kept free of aerogel.

Figure 20:
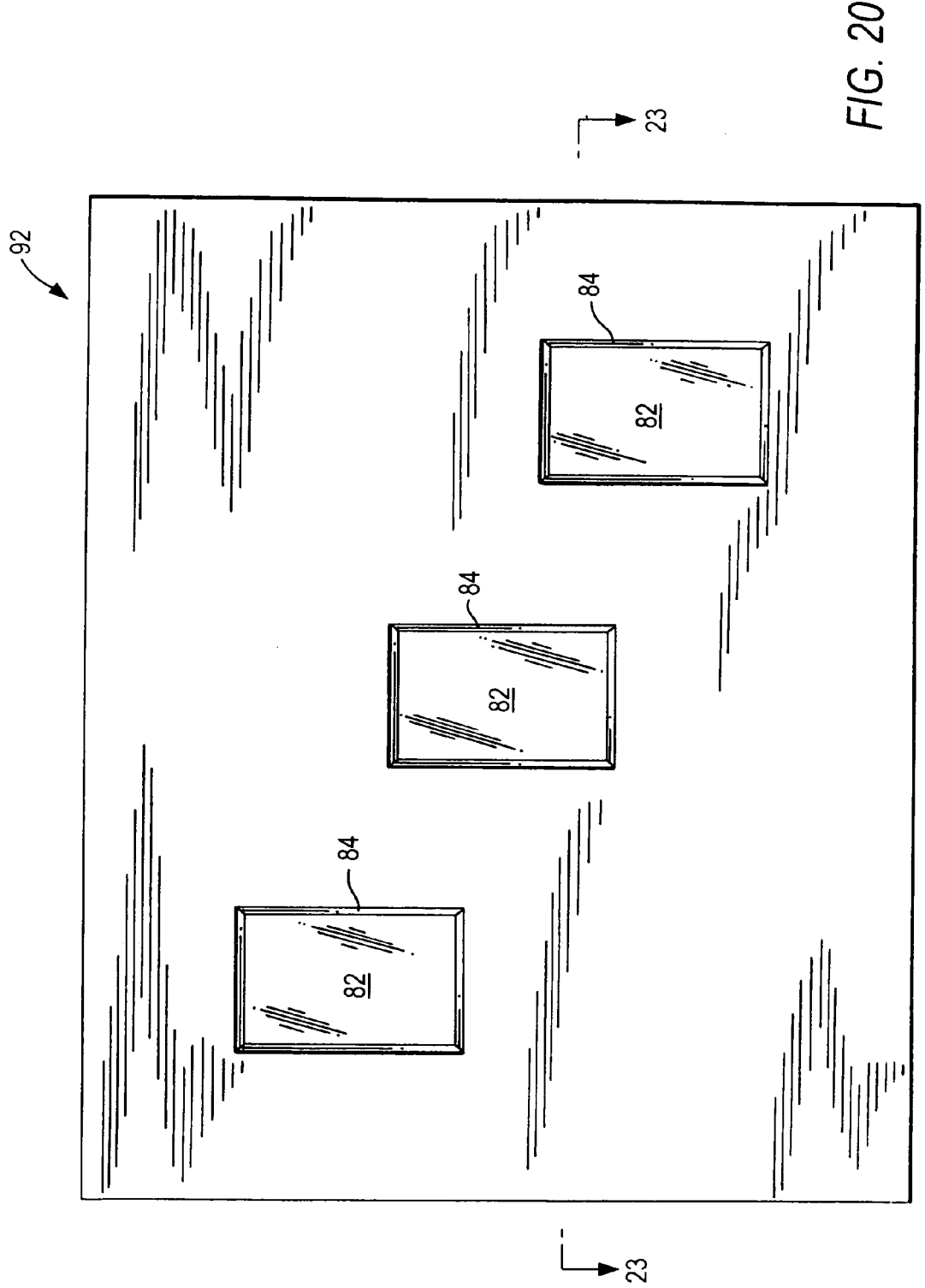
FIG. 20 is a plan view of an alternate embodiment of the glass panel of the present invention.
Figure 21:
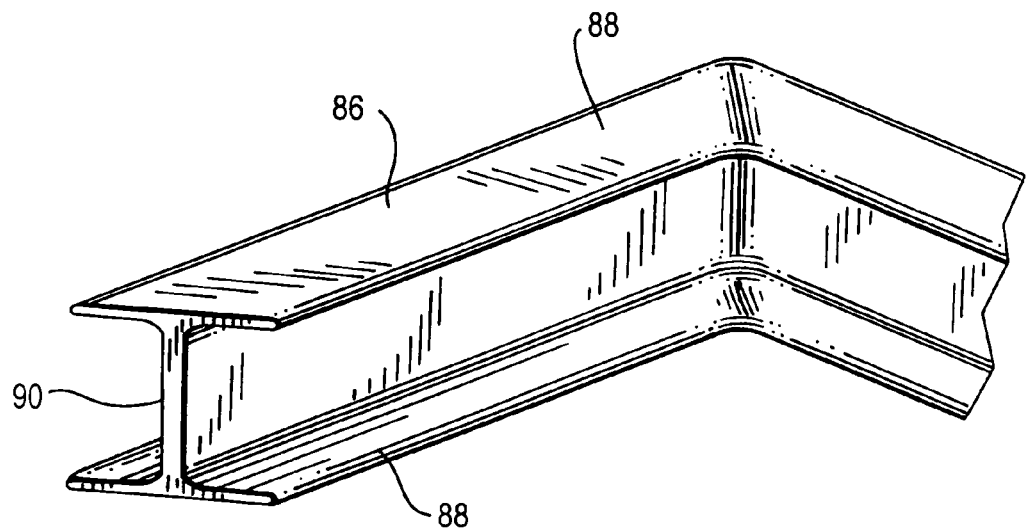
FIG. 21 shows a first way to make a frame for a window through the glass panel.

The windows 82, shown in FIG. 20 to be rectangles, may be of any shape, and, depending upon the size of the glass panel 80, any desired number of windows could be included. One possible way to produce frame 84 is shown in FIG. 21, where elongated frame member 86 is shown schematically. Elongated frame member 86 is similar to connector 18, described above, in having a pair of parallel planes members 88 joined by a connecting member 90, so that it has the appearance of an I-beam. Elongated frame member 86 may be cut to desired lengths and at desired angles, so that the pieces so obtained may be used to form frames 84 of any desired size and shape. As with connectors 18 described above, the individual pieces of elongated frame member 86 are bonded to one of the glass plates being used to form glass panel 80 in the shape desired for the frame 84. Then the other glass plate is bonded to the pieces when the two glass plates are being joined together.

Figure 22:
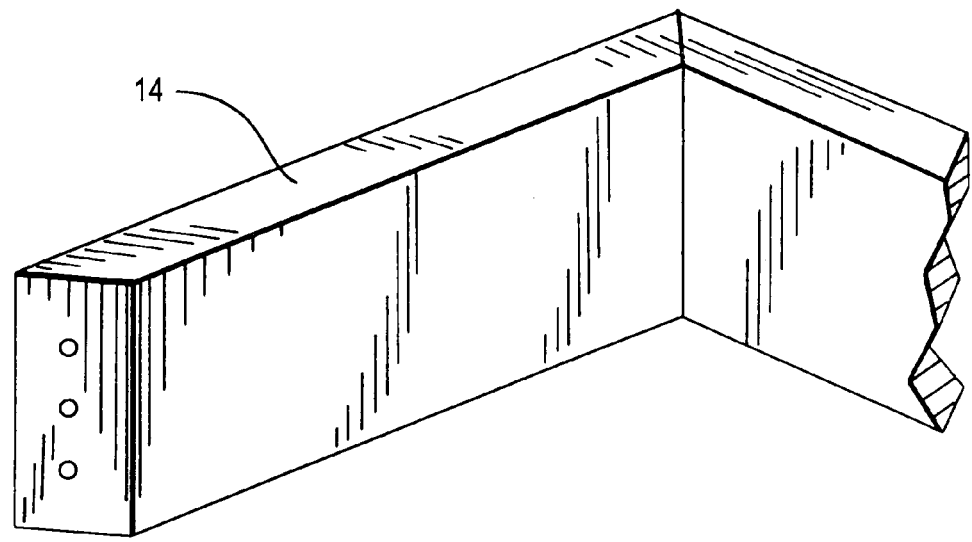
FIG. 22 shows an alternative way to make a frame for such a window.

Alternatively, spacers 14 may be used to construct frames 84 as shown in FIG. 22 in the same manner as their use was described above. In other words, pieces of spacer 14 may be cut to desired lengths and at desired angles, so that the pieces of spacer 14 may be used to form frames 84 of any desired shape and size. As described above, the individual prices of spacer 14 are attached to one of the glass plates being used to form glass panel 80 in the shape desired for the frame 84 with an adhesive. Then the other glass plate is attached to the pieces of spacer 14 with an adhesive when the two glass plates are being joined together to form the glass panel 80.

Figure 23:
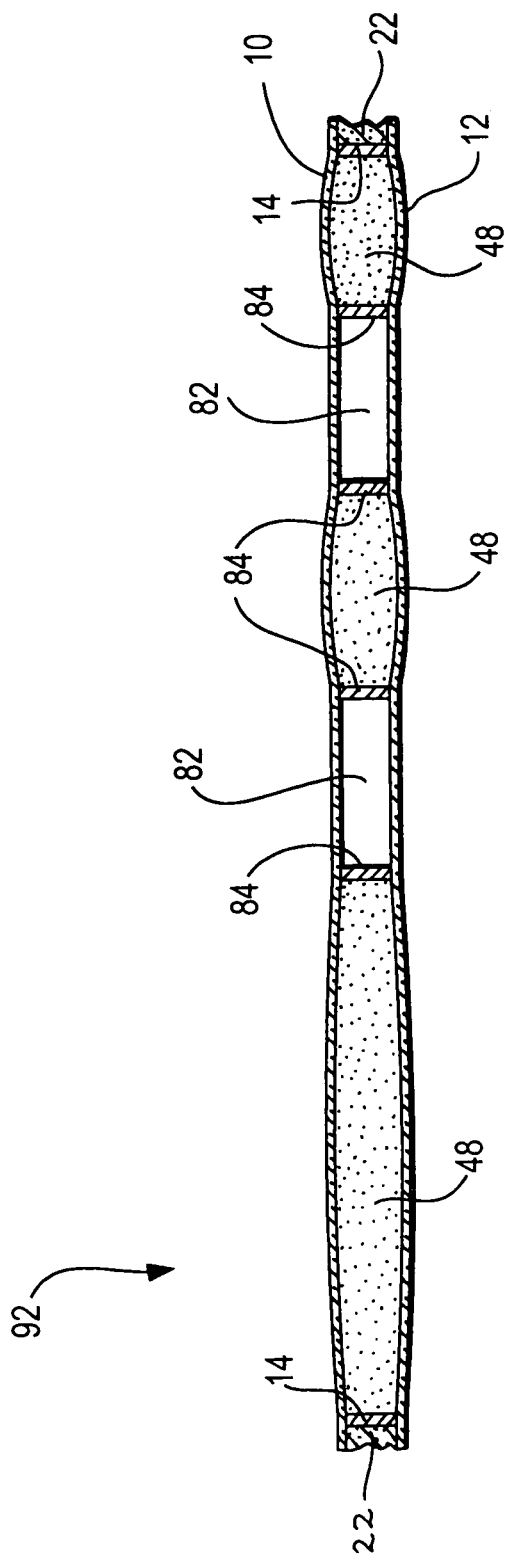
FIG. 23 is a cross-sectional view taken as indicated in FIG. 20.

Whether the frames 84 are constructed from elongated frame members 86 or from spacers 14, the frames 84, like connectors 18 described above, prevent overexpansion of the glass panel 80 during the filling process. Referring to FIG. 23, a cross-sectional view taken as indicated in FIG. 20, frames 84 limit the bulging of the glass plates 10, 12 to the regions filled with aerogel 48. For the sake of clarity, the thickness of the glass panel 80 relative to its width and the bulging of the glass plates 10, 12 have been exaggerated.

Modifications to the above would be obvious to those of ordinary skill in the art, but would not bring the invention so modified beyond the scope of the appended claims. For example, other means for compressing aerogel in a closed cavity between a pair of parallel glass plates may be readily apparent or devised by those of ordinary skill in the art. In this regard, the glass panel may be constructed using a permanently collapsible spacer, perhaps including a deformable metallic member, such as one of aluminum. During the filling process, which may be conducted at ambient atmospheric pressure without prior expansion of the cavity between the glass plates, the collapsible spacer maintains the glass plates at a preselected separation from one another. When the cavity between the glass plates is filled with aerogel, and the hole through which the aerogel was delivered to the cavity is sealed, the glass panel may be compressed about its edges in order to permanently collapse the collapsible spacer by a desired amount, thereby compressing the aerogel to lock its component particles into fixed positions to prevent settling,
and causing the two glass plates to bulge outward to a desired extent to maintain the aerogel in a compressed state.

Alternatively, the glass panel may be constructed using polymeric spacer 14, as discussed in detail above. The filling process is then carried out without expanding the volume between its parallel glass plates, for example, by filling the volume or cavity with aerogel while the atmospheric pressure in the cavity is equal to that outside the glass panel. At the end of the filling process, hole 50 is sealed with plug 66 as previously described. Then, air is withdrawn from the cavity through capillary tube 70 to create at least a partial vacuum, for example, a 20% vacuum, therewithin. Under such conditions, the higher pressure of the ambient air outside the glass panel pushes its parallel glass plates toward one another to compress the aerogel and to lock its component particles into fixed positions to prevent settling. At the same time, the glass plates remain parallel to one another because the polymeric spacer 14 is of a polymer foam, which collapses as the glass plates are pushed toward one another. This ensures that the glass plates will not bulge inwardly toward one another in the center of the glass panel, a result which some may find aesthetically objectionable. In this way, the thickness of the insulation and, as a consequence, the R-value remain constant at all points on the surface of the glass panel. Finally, the capillary tube 70 is crimped and closed off to maintain the cavity at the desired degree of vacuum.

In a further alternative, the glass panel may also be constructed using polymeric spacer 14, as discussed in detail above. The filling process is again carried out without expanding the volume between its parallel glass plates, for example, by filling the volume or cavity with aerogel while the atmospheric pressure in the cavity is equal to that outside the glass panel. At the end of the filling process, hole 50 is sealed with plug 66 as previously described. Finally, compression clips are installed around the perimeter of the glass panel to push its parallel glass plates toward one another to compress the aerogel and to lock its component particles into fixed positions to prevent settling. At the same time, the polymeric spacer 14 is compressed slightly because it is of a polymeric foam.

Figure 24:
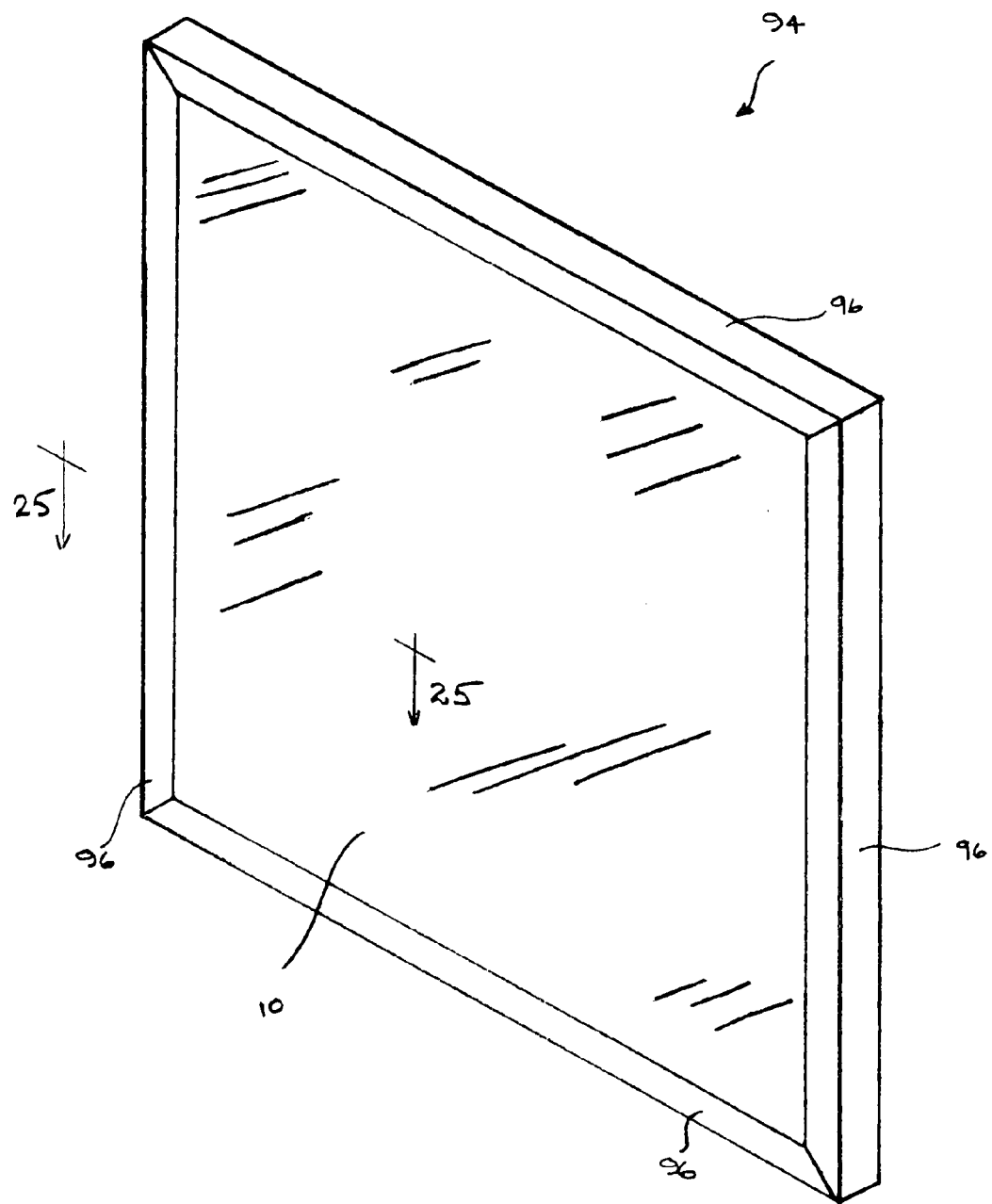
FIG. 24 is a perspective view of still another embodiment of the present invention.

Referring to FIG. 24, a perspective view of a glass panel 94 of this type, elongated compression clips 96 are installed around the perimeter of glass panel 94 and appear to form a frame therearound. Compression clips 96 may be made of stainless steel, or extruded from aluminum or a plastic material, such as polyvinyl chloride (PVC). Compression clips 96 may also be formed from a pultruded composite material.

Figure 25:
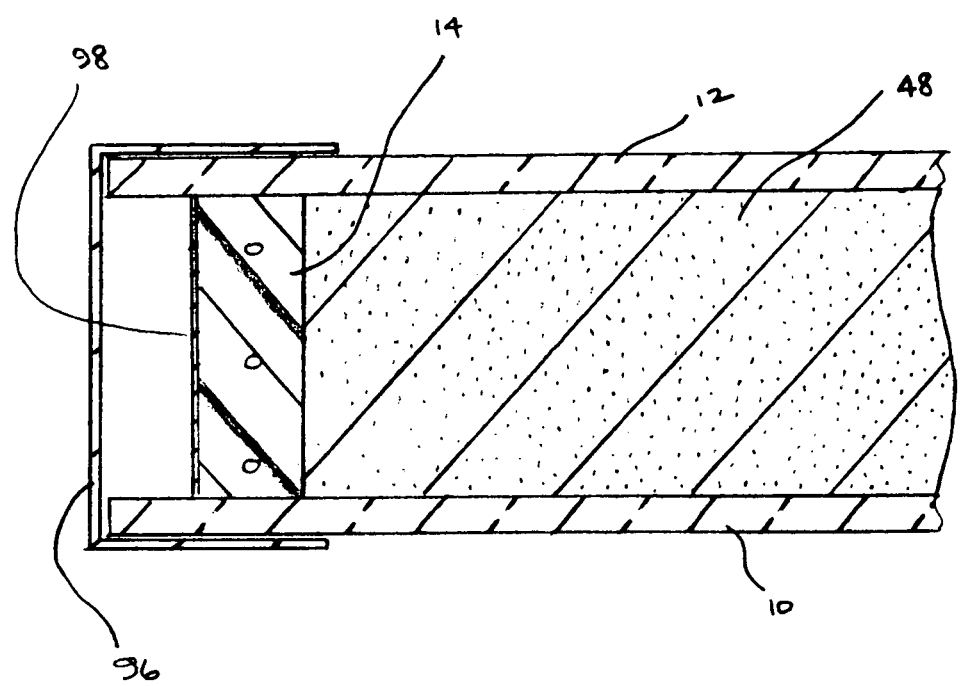
FIG. 25 is a cross-sectional view taken as indicated in FIG. 24.

FIG. 25 is a cross-sectional view taken as indicated in FIG. 24. Compression clip 96 has a substantially U-shaped cross section, and extends an amount onto glass plates 10, 12 sufficient to compress glass plates 10, 12 toward one another and against spacer 14. Spacer 14, it will be recalled, has a width of approximately 0.75 inch. Compression clips 96 are preferably of a width such that they compress the spacer 14 a few hundredths of an inch, such as to 0.71 inch, to immobilize the aerogel 48. Assuming that the glass panel 94 has been completely filled, in the manner described above, before being sealed, such a compression will adequately achieve that end, so long as the glass panel 94 is not too large. It should be noted that, in FIG. 25, spacer 14 has an aluminum foil backing layer 98, which, as mentioned above, reduces the moisture permeability of the spacer 14 and acts as a vapor seal.

Each of these last three methods may be carried out at ambient pressure so that no special equipment is required, other than the means for vibrating the glass panels while they are being filled and the means for preventing the smallest particles of aerogel from accumulating below the delivery point, hole 50, both of which means have been described above.

What is claimed is:

1. A translucent insulated glass panel, said glass panel comprising:
   a first glass plate, said first glass plate having preselected dimensions and area and having two faces, said first glass plate having outer edges, said outer edges defining a perimeter of said first glass plate;
   a spacer, said spacer being elongated and having a width and a first side and a second side, said first side of said spacer being attached to one of said two faces of said first glass plate inward of said outer edges, said spacer forming a continuous closed path on said first glass plate;
   a second glass plate, said second glass plate having preselected dimensions and area substantially identical to said preselected dimensions and area of said first glass plate, said second glass plate having two faces and outer edges, said outer edges defining a perimeter of said second glass plate, one of said two faces of said second glass plate being attached to said second side of said spacer, said spacer being inward of said edges of said second glass plate, said spacer and first and second glass plates thereby forming a closed cavity between said first and second glass plates;
   a translucent insulating material, said translucent insulating material being a particulate material and filling said cavity between said first and second glass plates, said translucent insulating material being in a compressed state whereby said cavity holds a greater amount of translucent insulating material than said cavity would hold if said translucent insulating material were in an uncompressed state; and
   at least one connector disposed within the closed cavity between the first and second glass plates, the connector being connected to each of the first and second glass plates, the connector being arranged to permit the translucent insulating material to flow around the connector when the cavity is being filled with the translucent insulating material.

2. A translucent insulated glass panel as claimed in claim 1 further comprising a sealant, said sealant covering said spacer between said edges of said first and second glass plates.

3. A translucent insulated glass panel as claimed in claim 1 wherein said first glass plate and said second glass plate are of low-iron glass.

4. A translucent insulated glass panel as claimed in claim 1 wherein said spacer is of a polymer foam.

5. A translucent insulated glass panel as claimed in claim 4 wherein said spacer includes a desiccant.

6. A translucent insulated glass panel as claimed in claim 4 wherein said spacer includes an aluminum foil backing layer.

7. A translucent insulated glass panel as claimed in claim 1 wherein said spacer is collapsed from an initially collapsible state, whereby, upon being collapsed, said translucent insulating material is placed into said compressed state.

8. A translucent insulated glass panel as claimed in claim 7 wherein said spacer includes a deformable metallic member.

9. A translucent insulated glass panel as claimed in claim 8 wherein said deformable metallic member is of aluminum.

10. A translucent insulated glass panel as claimed in claim 1 wherein said translucent insulating material is an aerogel.

11. A translucent insulated glass panel as claimed in claim 1 wherein said translucent insulating material in said compressed state occupies a volume at least 10% smaller than it would occupy in an uncompressed state.

12. A translucent insulated glass panel as claimed in claim 1 further comprising a window therewithin, said window being free of translucent insulating material so as to be a transparent region within said translucent insulated glass panel, said window having a frame, said frame having at least one frame member bonded to said one of said two faces of said first glass plate within said cavity and to said one of said two faces of said second glass plate within said cavity, said at least one frame member forming said frame so as to keep a region within said cavity free of translucent insulating material.

13. A translucent insulated glass panel as claimed in claim 12 wherein said at least one frame member is an elongated frame member, said elongated frame member having a pair of parallel planar members joined by a connecting member, one of said pair of parallel planar members being bonded to said one of said two faces of said first glass plate within said cavity and the other of said pair of parallel planar members being bonded to said one of said two faces of said second glass plate within said cavity.

14. A translucent insulated glass panel as claimed in claim 12 wherein said at least one frame member is an elongated spacer, said elongated spacer having a width and a first side and a second side, said first side of said elongated spacer being attached to said one of said two faces of said first glass plate within said cavity and said second side of said elongated spacer being attached to said one of said two faces of said second glass plate within said cavity.

15. A translucent insulated glass panel as claimed in claim 1 further comprising a plurality of compression clips, said compression clips having a substantially U-shaped cross section and extending from said first glass plate to said second glass plate, said compression clips pushing said first glass plate and said second glass plate toward one another, thereby placing said translucent insulating material into said compressed state.

16. A translucent insulated glass panel as claimed in claim 15 wherein said compression clips are elongated.

17. A translucent insulated glass panel as claimed in claim 15 wherein said plurality of compression clips extend around said perimeters of said first and second glass plates.

18. A translucent insulated glass panel as claimed in claim 15 wherein said compression clips are of stainless steel.

19. A translucent insulated glass panel as claimed in claim 15 wherein said compression clips are of extruded aluminum.

20. A translucent insulated glass panel as claimed in claim 15 wherein said compression clips are of an extruded plastic material.

21. A translucent insulated glass panel as claimed in claim 20 wherein said plastic material is polyvinyl chloride (PVC).

22. A translated insulated glass panel as claimed in claim 15 wherein said compression clips are of a pultruded composite material.

23. The A translucent insulated glass panel of claim 1, wherein the connector includes a pair of opposed first and second parallel planar members, each of the parallel planar members being connected to one of the first and second glass plates.

24. The translucent insulated glass panel of claim 23, wherein the pair of opposed first and second parallel planar members are connected to each other by a connector.

25. The translucent insulated glass panel of claim 1, wherein an unobstructed 360° path is defined about the connector within the closed cavity to permit the translucent insulating material to flow around the connector when the cavity is being filled with the translucent insulating material.

* * * * *